United States Patent [19]

Bok et al.

[11] Patent Number: 5,171,613
[45] Date of Patent: Dec. 15, 1992

[54] APPARATUS AND METHODS FOR APPLICATION OF COATINGS WITH SUPERCRITICAL FLUIDS AS DILUENTS BY SPRAYING FROM AN ORIFICE

[75] Inventors: Hendrik F. Bok, Fairhaven, Mass.; Charles W. Glancy, South Charleston; Kenneth L. Hoy, St. Albans; Chinsoo Lee; Kenneth A. Nielsen, both of Charleston, all of W. Va.

[73] Assignee: Union Carbide Chemicals & Plastics Technology Corporation, Danbury, Conn.

[21] Appl. No.: 586,204

[22] Filed: Sep. 21, 1990

[51] Int. Cl.⁵ .............................................. B05D 1/02
[52] U.S. Cl. ..................................... 427/422; 427/426; 427/8; 239/11; 239/13; 239/135; 239/139; 118/667
[58] Field of Search ............................ 427/8, 422, 426; 118/302, 667; 239/13, 11, 135, 139, 467, 451, 456, 526

[56] References Cited

U.S. PATENT DOCUMENTS

| | | |
|---|---|---|
| 2,737,415 | 3/1956 | Wheeler-Nicholson ...... 118/302 X |
| 3,013,730 | 12/1961 | Bok et al. .................... 239/13 X |
| 3,116,020 | 12/1963 | Rosen et al. .................... 239/578 |
| 3,176,922 | 4/1965 | Decker ............................ 118/302 |
| 3,330,484 | 7/1967 | Johnson et al. ................ 239/414 |
| 3,556,411 | 1/1971 | Nord et al. ..................... 239/581 |
| 3,633,828 | 1/1972 | Larson ........................ 239/526 X |
| 3,647,147 | 3/1972 | Cook ............................... 239/599 |
| 3,659,787 | 5/1972 | Ito ..................................... 239/15 |
| 3,734,406 | 5/1973 | Runstadler, Jr. et al. ............ 239/8 |
| 3,754,710 | 8/1973 | Chimura ........................ 239/597 |
| 3,759,450 | 9/1973 | Fram et al. ..................... 239/427 |
| 3,835,294 | 9/1974 | Krohn et al. ................... 219/305 |
| 3,876,363 | 4/1975 | LaHaye et al. .................... 431/11 |
| 3,907,202 | 9/1975 | Binoche .......................... 239/15 |
| 4,055,300 | 10/1977 | Binoche .......................... 239/15 |
| 4,097,000 | 6/1978 | Derr ................................. 239/599 |
| 4,124,528 | 11/1978 | Modell ............................ 252/411 |
| 4,189,914 | 2/1980 | Marek et al. ..................... 60/726 |
| 4,346,849 | 8/1982 | Rood ............................... 239/597 |
| 4,375,387 | 3/1983 | deFilippi et al. ................. 202/169 |
| 4,383,645 | 5/1983 | Figiel et al. ........................ 239/13 |
| 4,522,789 | 6/1985 | Kelly et al. ...................... 422/133 |
| 4,582,731 | 4/1986 | Smith .............................. 427/421 |
| 4,619,735 | 10/1986 | Norton ............................. 162/135 |
| 4,644,140 | 2/1987 | Hillinger ......................... 219/535 |
| 4,734,227 | 3/1988 | Smith ................................ 264/13 |
| 4,734,451 | 3/1988 | Smith .............................. 524/493 |
| 4,737,384 | 4/1988 | Murthy et al. ................... 427/369 |
| 4,923,720 | 5/1990 | Lee et al. ...................... 427/385.5 |
| 5,027,742 | 7/1991 | Lee et al. ........................ 427/422 |
| 5,057,342 | 10/1991 | Hoy et al. ........................ 427/422 |

FOREIGN PATENT DOCUMENTS

| | | |
|---|---|---|
| 2603664 | 8/1977 | Fed. Rep. of Germany . |
| 2853066 | 6/1980 | Fed. Rep. of Germany . |
| 55-84328 | 6/1980 | Japan . |
| 58-168674 | 10/1983 | Japan . |
| 59-16703 | 1/1984 | Japan . |
| 62-152505 | 7/1987 | Japan . |
| 868061 | 4/1988 | South Africa . |
| 0839598 | 6/1981 | U.S.S.R. ........................... 118/667 |

OTHER PUBLICATIONS

Francis, A. W., "Ternary Systems of Liquid Carbon Dioxide", J. Phys. Chem. 58:1099, Dec. 1954.

(List continued on next page.)

Primary Examiner—Michael Lusignan
Assistant Examiner—Diana L. Dudash
Attorney, Agent, or Firm—Morris N. Reinisch

[57] ABSTRACT

This invention is directed to improved spraying apparatus for coating substrates with a coating material and supercritical fluid which apparatus is provided with various features, either alone or in combination, to prevent undesirable premature cooling of the coating mixture which might detrimentally affect the final coating on the substrate; to prevent undesirable depressurization of supercritical fluid contained in the coating mixture which remains in the spray gun after spraying has been stopped; and/or to desirably provide the ability to mix the components of the coating mixture directly in the spray gun. Methods for utilizing these features in the spraying apparatus of the present invention are also disclosed.

27 Claims, 22 Drawing Sheets

OTHER PUBLICATIONS

Smith, R. D., et al., "Direct Fluid Injection Interface for Capillary Supercritical Fluid Chromatography-Mass Spectrometry", J. Chromatog. 247 (1982):231-243.

Krukonis, V., "Supercritical Fluid Nucleation of Difficult-to-Comminute Solids", paper presented at 1984 Annual Meeting, AIChE, San Francisco, Calif., Nov. 25-30, 1984.

Dandage, D. K., et al., "Structure Solubility Correlations: Organic Compounds and Dense Carbon Dioxide Binary Systems", Ind. Eng. Chem. Prod. Res. Dev. 24: 162-166 (1985).

Matson, D. W., et al., "Production of Powders and Films by the Rapid Expansion of Supercritical Solutions", J. Materials Science 22: 1919-1928 (1987).

McHugh, M. A. et al., "Supercritical Fluid Extraction, Principles and Practice", Butterworth Publishers (1986) Contents and Appedix.

Cobbs, W. et al., "High Solids Coatings Above 80% By Volume", Water-Borne & High Solids Coatings Symposium, Mar. 1980.

Matson, D. W. et al., "Production of Fine Powders by the Rapid Expansion of Supercritical Fluid Solutions", Advances in Ceramics, vol. 21, pp. 109-121 (1987).

Kitamura, Y., et al., "Critical Superheat for Flashing of Superheated Liquid Jets", Ind. Eng. Chem. Fund. 25:206-211 (1986).

Petersen, R. C. et al., "The Formation of Polymer Fibers From the Rapid Expansion of SCF Solutions", Pol. Eng. & Sci. (1987) vol. 27, p. 16.

"Critical Temperatures and Critical Pressures of the Elements", CRC Handbook of Chemistry and Physics, 67th Edition, CRC Press, Ind., Boca Ratan, Fla. (1986-1987) pp. F62-F64.

Martins, C. R., Editor, Technology of Paints, Varnishes and Lacquers, Chapter 36, Application, Robert E. Krieger Publishing Company, Huntington, N.Y. pp, 644-689, (1974).

Fair, J., "Sprays", Kirk-Othmer Encyclopedia of Chem. Tech., Third Edition, vol. 21, Whiley-Interscience, N.Y., 1983, pp. 466-483.

Zink, S. C., "Coating Processes", Kirk-Othmer Encyclopedia of Chem. Tech., Third Edition, vol. 6, Wiley-Interscience, N.Y., 1979, pp. 386-426.

Long, G. E., "Spraying Theory and Practice", Chemical Engineering, Mar. 13, 1978, pp. 73-77.

"Air Spray Manual", TD10-2R, Binks Manufacturing Company, Franklin Park, Ill., 1976, pp. 1-25.

"Compressed Air Spray Gun Principles", TDIO-1R-4, Binks Manufacturing Co., Franklin Park, Ill., Jan., 1987, pp. 1-12.

"Airless Spray Manual", TD-11-2R, Binks Manufacturing Co., Franklin Park, Ill., Nov., 1986, pp. 1-16.

"Airless Spraying", TD 11-1R-2, Binks Manufacturing Co., Franklin Park, Ill., Jan., 1986, pp. 1-12.

"Electrostatic Spraying", TD-17-1R, Binks Manufacturing Co., Franklin Park, Ill., pp. 1-7.

"Hot Spraying", TD-42-1R-2, Binks Manufacturing Co., Franklin Park, Ill., pp. 1-4.

"The Ultimate Spray Finishing Technology", Airmix Product Guide, Kremlin, Inc., Addison, Ill. pp. 1-11.

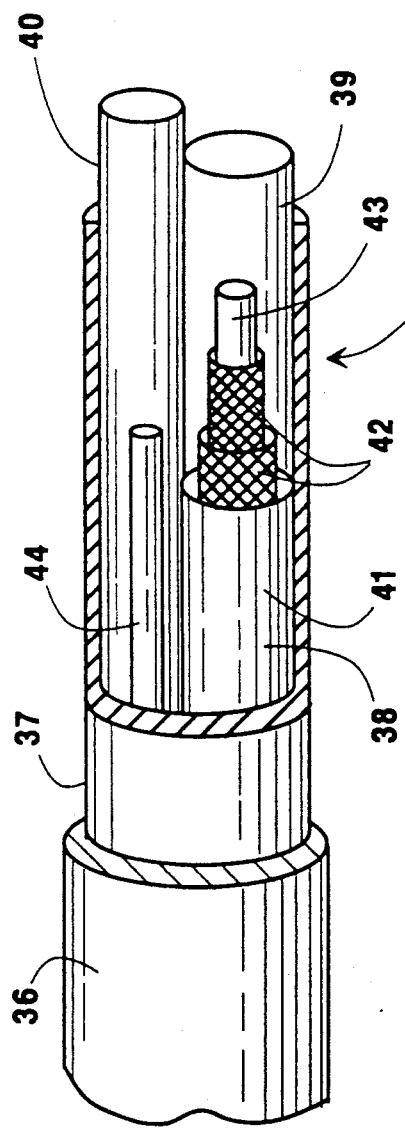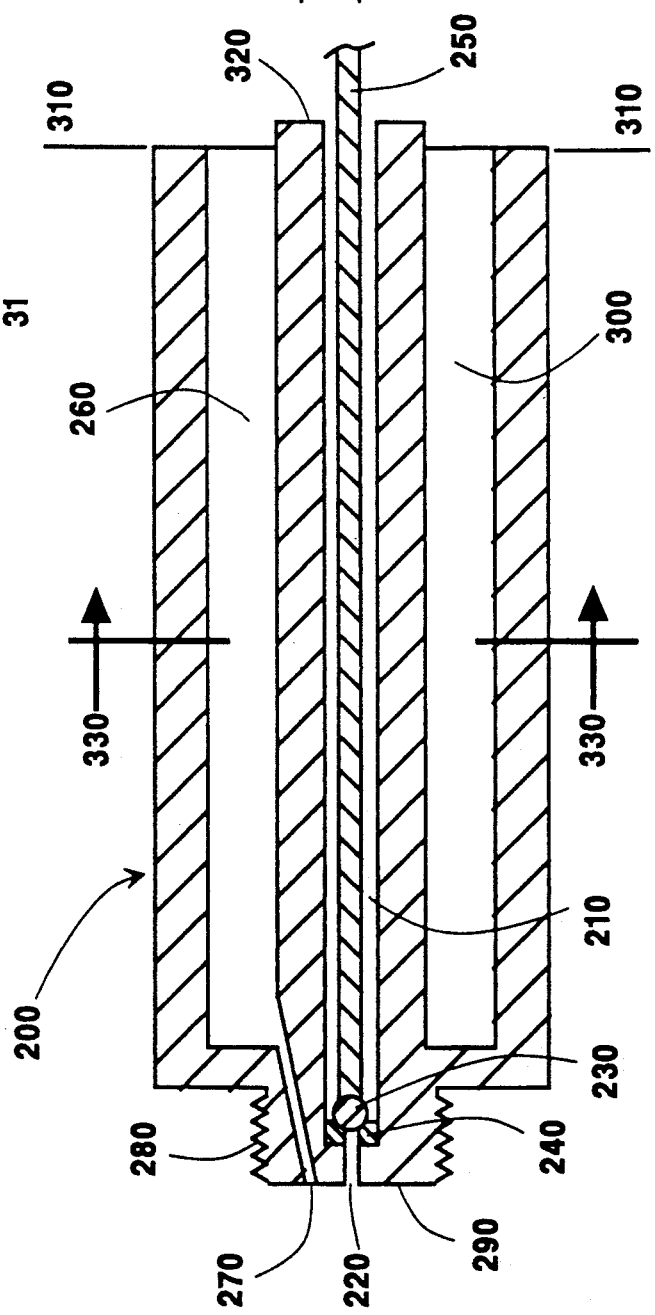

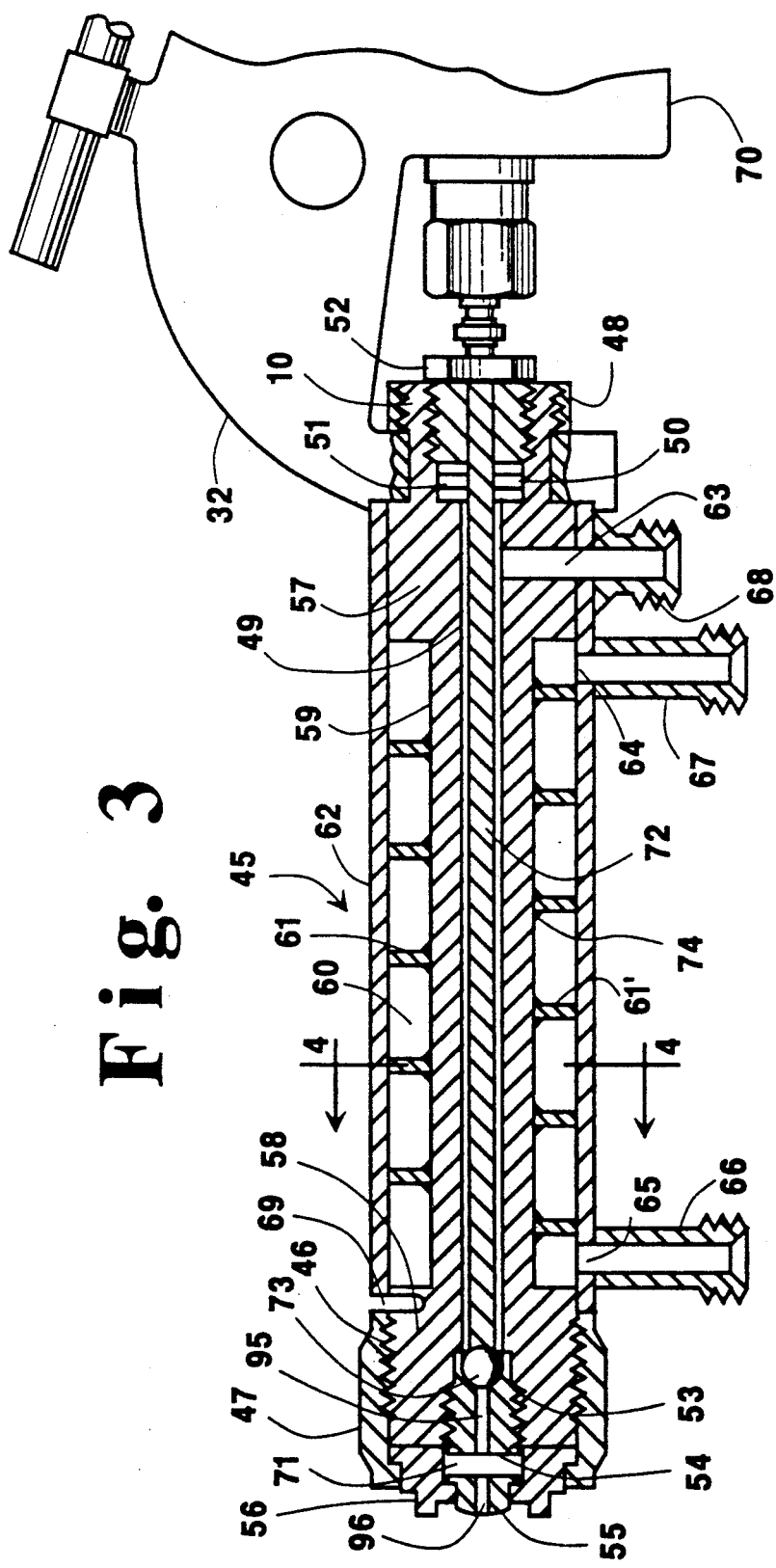

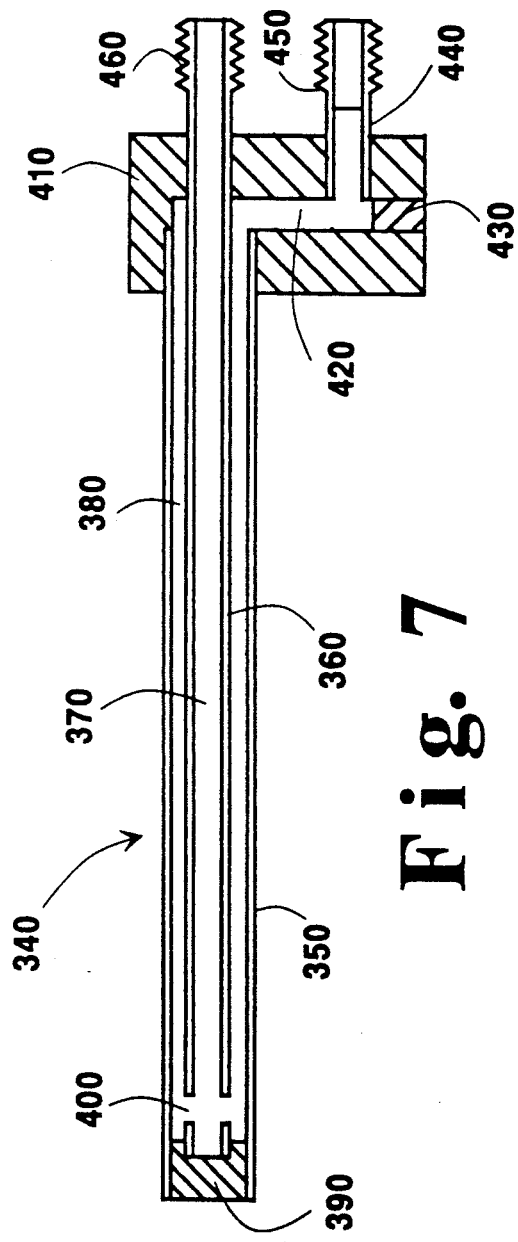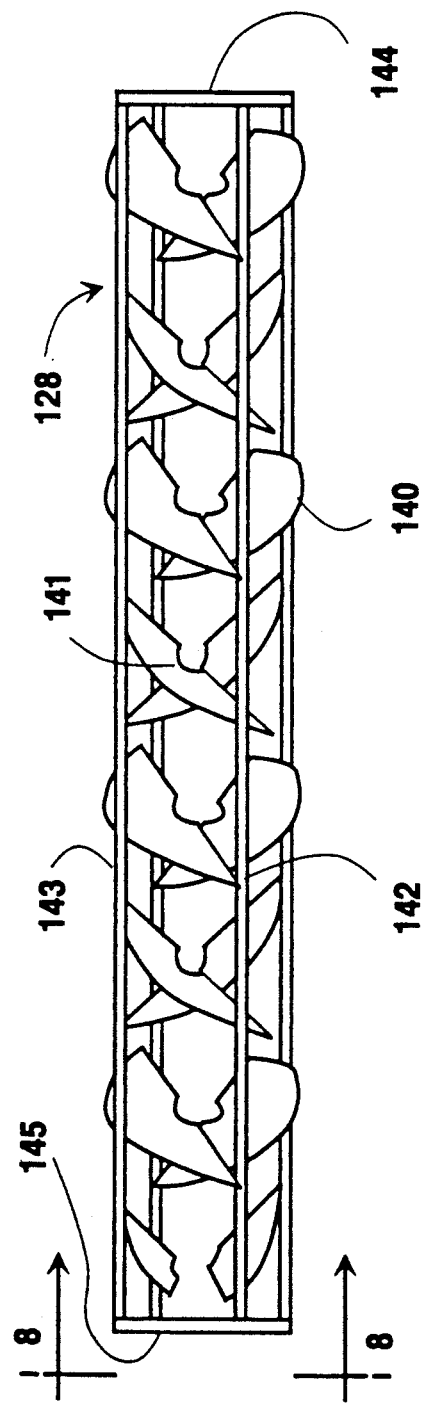

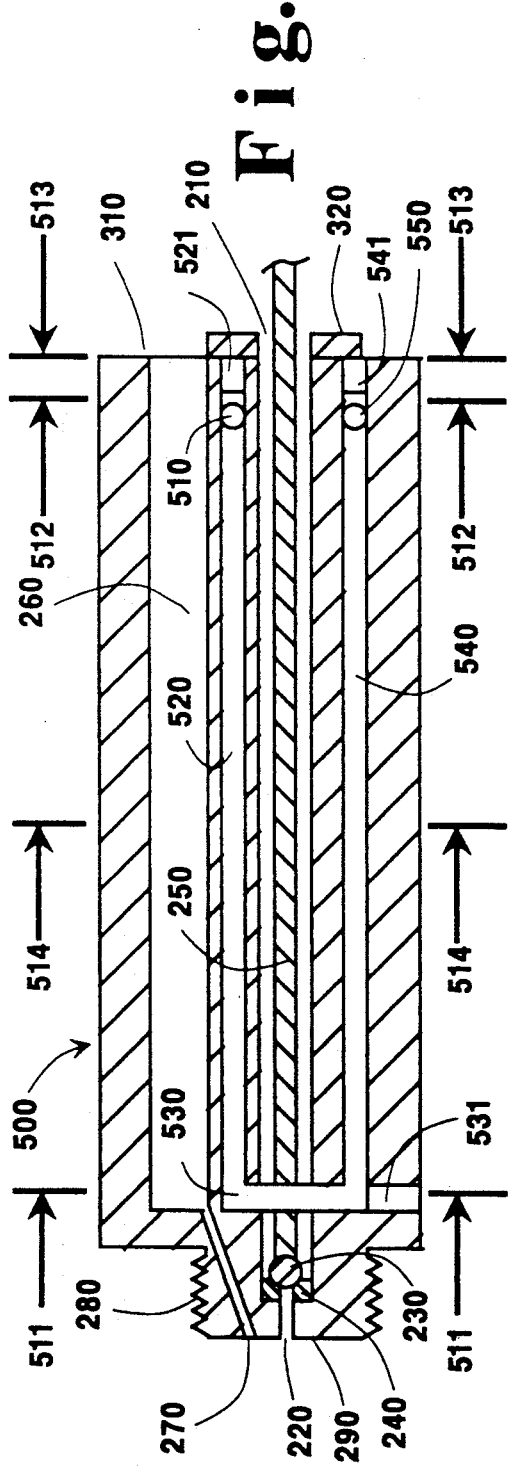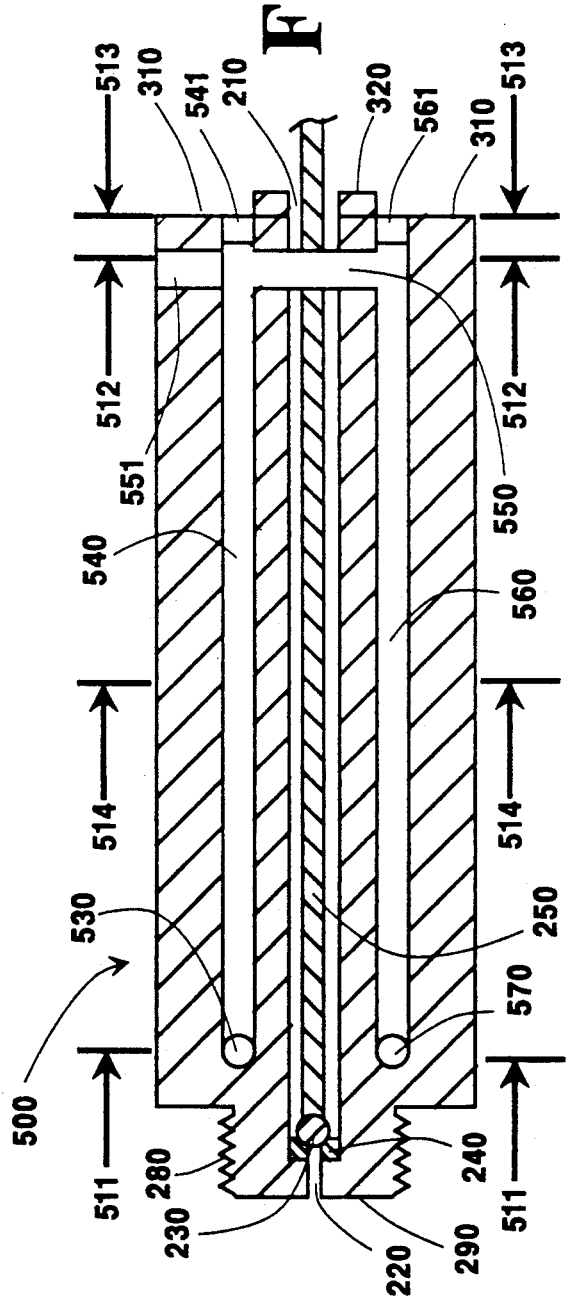

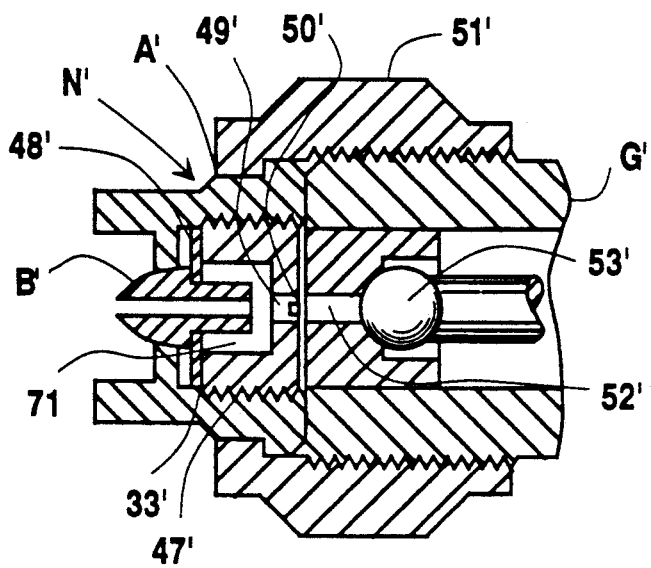
Fig. 28 (PRIOR ART)
Fig. 29
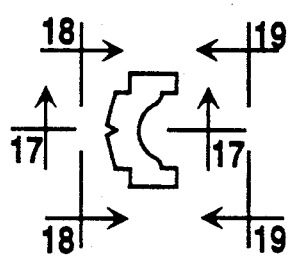
Fig. 31
Fig. 30
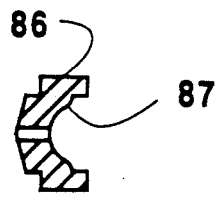
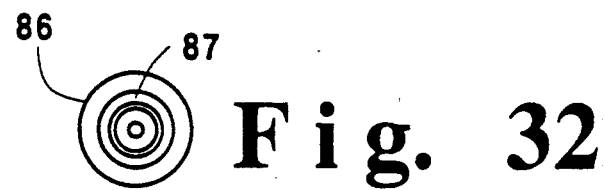
Fig. 32
Fig. 33
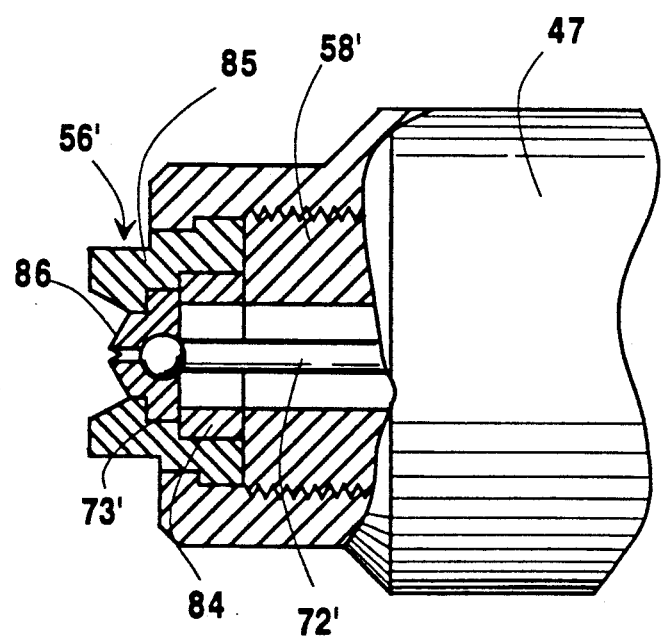

F I G. 36b

F I G. 37b
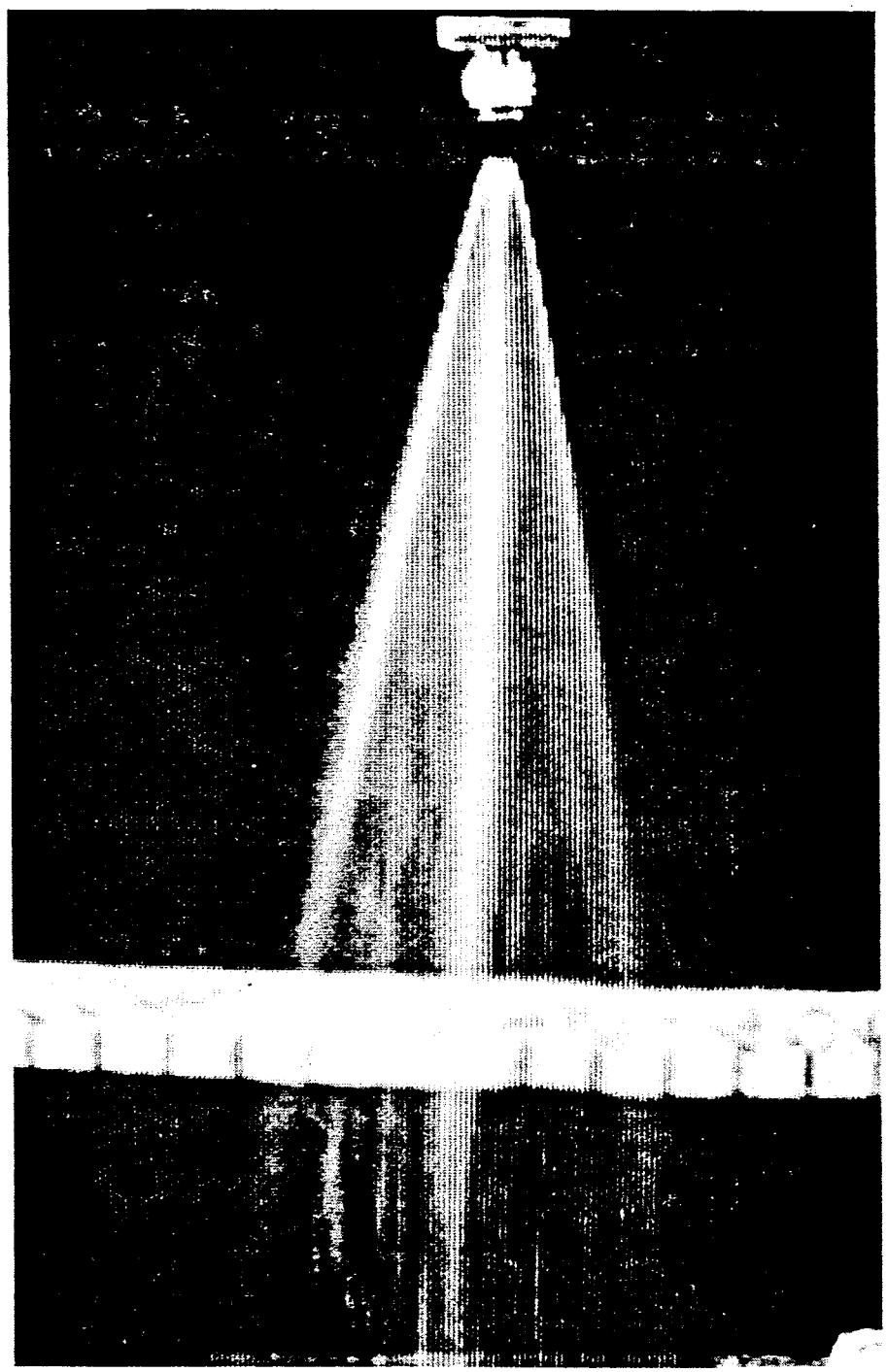

APPARATUS AND METHODS FOR APPLICATION OF COATINGS WITH SUPERCRITICAL FLUIDS AS DILUENTS BY SPRAYING FROM AN ORIFICE

RELATED PATENT APPLICATIONS

This application is related to application Ser. No. 418,820, filed Oct. 4, 1989, now U.S. Pat. No. 4,923,720, issued May 8, 1990. This application also contains subject matter related to U.S. patent applications Ser. No. 218,896, filed Jul. 14, 1988; Ser. No. 218,910, filed Jul. 14, 1988; Ser. No. 327,484, filed Mar. 22, 1989; Ser. No. 327,274, filed Mar. 22, 1989; Ser. No. 326,945, filed Mar. 22, 1989, now U.S. Pat. No. 5,066,522; Ser. No. 327,273, filed Mar. 22, 1989 now U.S. Pat. No. 5,057,342; and Ser. No. 327,275, filed Mar. 22, 1989, now U.S. Pat. No. 5,009,367, the contents of which are all incorporated herein by reference as if set out in full.

FIELD OF THE INVENTION

This invention relates in general to spraying apparatus for coating substrates wherein the coating mixture that is sprayed contains a compressible fluid and a non-compressible fluid, particularly a coating material and supercritical fluid which is used as a viscosity reducing diluent. More particularly, this invention is directed to improved spraying apparatus for coating substrates with a coating material and supercritical fluid which apparatus is provided with various features, either alone or in combination, to prevent undesirable premature cooling of the coating mixture which might detrimentally affect the final coating on the substrate; to prevent undesirable depressurization of supercritical fluid contained in the coating mixture which remains in the spray gun after spraying has been stopped; and/or to desirably provide the ability to mix the components of the coating mixture directly in the spray gun. Methods for utilizing these features in the spraying apparatus of the present invention are also disclosed.

BACKGROUND OF THE INVENTION

Prior to the inventions described in the aforementioned related patent applications, the liquid spary application of coatings, such as lacquers, enamels and varnishes, was effected solely through the use of organic solvents as viscosity reduction diluents. However, because of increased environmental concern, efforts have been directed to reducing the pollution resulting from painting and finishing operations. For this reason, there has been a great deal of emphasis placed on the development of new coatings technologies which diminish the emission of organic solvent vapors. A number of technologies have emerged as having met most but not all of the performance and application requirements, and at the same time meeting emission requirements and regulations. They are: (a) powder coatings, (b) water-borne dispersions, (c) water-borne solutions, (d) non-aqueous dispersions, and (e) high solids coatings. Each of these technologies has been employed in certain applications and each has found a niche in a particular industry. However, at the present time, none has provided the performance and application properties that were initially expected.

Powder coatings, for example, while providing ultra low emission of organic vapors, are generally characterized as having poor gloss or good gloss with heavy orange peel, poor distinctness of image gloss (DOI), and poor film uniformity. Moreover, to obtain even these limited performance properties generally requires excessive film thickness and/or high curing temperatures. Pigmentation of powder coatings is often difficult, requiring at times milling and extrusion of the polymer-pigment composite mixture followed by cryogenic grinding. In addition, changing colors of the coating often requires its complete cleaning, because of dust contamination of the application equipment and finishing area.

Water-borne coatings, on the other hand, are very difficult to apply under conditions of high relative humidity without serious coating defects. There defects result from the fact that under conditions of high humidity, water evaporates more slowly than the organic cosolvents of the coalescing aid, and as might be expected in the case of aqueous dispersions, the loss of the organic cosolvent/coalescing aid interferes with film formation. Poor gloss, poor uniformity, and pin holes unfortunately often result. Additionally, water-borne coatings are not as resistant to corrosive environments as are more conventional solvent-borne coatings.

Coatings applied with organic solvents at high solids levels avoid many of the pitfalls of powder and water-borne coatings. However, in these systems, the molecular weight of the polymer has been decreased and reactive functionality has been incorporated therein so that further polymerization and crosslinking can take place after the coating has been applied. It has been hoped that this type of coating will meet the ever-increasing regulatory requirements and yet meet the most exacting coatings performance demands. However, there is a limit as to the ability of this technology to meet the performance requirement of a commercial coating operation. Present high solids systems have difficulty in application to vertical surfaces without running and sagging of the coating. If they possess good reactivity, they often have poor shelf and pot life. However, if they have adequate shelf stability, they cure and/or crosslink slowly or require high temperature to effect an adequate coating on the substrate.

Clearly, what was needed was an environmentally safe, non-polluting diluent that can be used to thin very highly viscous polymer and coatings compositions to liquid spray application consistency. Such a diluent would allow utilization of the best aspects of organic solvent-borne coatings applications and performance while reducing the environmental concerns to an acceptable level. Such a coating system could meet the requirements of shop- and field-applied liquid spray coatings as well as factory-applied finishes and still be in compliance with environmental regulations.

Such a needed diluent was indeed found and is discussed in the aforementioned related applications which teach, among other things, the utilization of supercritical fluids, such as supercritical carbon dioxide fluid, as diluents in highly viscous organic solvent-borne and/or highly viscous non-aqueous dispersions coatings compositions to dilute these compositions to application viscosity required for liquid spray techniques.

As used herein, it will be understood that a "supercritical fluid" is a material which is at a temperature and pressure such that it is at, above, or slightly below its "critical point". As used herein, the "critical point" is the transition point at which the liquid and gaseous states of a substance merge into each other and represents the combination of the critical temperature and critical pressure for a given substance. The "critical temperature", as used herein, is defined as the temperature above which a gas cannot be liquefied by an increase in pressure. The "critical pressure", as used herein, is defined as that pressure which is just sufficient to cause the appearance of two phases at the critical temperature.

Also as used herein, a "coating material" is meant to include a coating composition containing no supercritical fluid. The coating material may provide a coating on a substrate which is decorative, such as paint; which is an adhesive; which is an insecticide; or the like. The specific nature of the coating material is not critical to the present invention provided that it can be admixed with supercritical fluid and sprayed.

A "coating mixture", as used herein, is meant to include a mixture of a coating material with at least one supercritical fluid.

Aforementioned U.S. Pat. No. 4,923,720 discloses processes and apparatus for the liquid spray application of coatings to a substrate that minimize the use of environmentally undesirable organic diluents. One of the process embodiments of that patent includes:

(1) forming a liquid mixture in a closed system, said liquid mixture comprising:
  (a) at least one polymeric compound capable of forming a coating on a substrate;
  (b) at least one supercritical fluid, in at least an amount which when added to (a) is sufficient to render the viscosity of said mixture of (a) and (b) to a point suitable for spray application; and
(2) spraying said liquid mixture onto a substrate to form a liquid coating thereon.

That application is also directed to a liquid spray process in which at least one active organic solvent (c) is admixed with (a) and (b) above prior to the liquid spray application of the resulting mixture to a substrate. The preferred supercritical fluid disclosed is supercritical carbon dioxide. The process employs an apparatus in which the mixture of the components of the liquid spray mixture can be blended and sprayed onto an appropriate substrate. The apparatus includes:

(1) means for supplying at least one polymeric compound;
(2) means for supplying at least one active solvent;
(3) means for supplying supercritical carbon dioxide fluid;
(4) means for forming a liquid mixture of components supplied from (1)-(3); and
(5) means for spraying said liquid mixture onto a substrate.

The apparatus may also provide for (6) means for heating any of said components and/or said liquid mixture of components.

Related copending U.S. patent application Ser. No. 218,910, filed Jul. 14, 1988, is directed to a liquid coatings application process and apparatus in which supercritical fluids, such as supercritical carbon dioxide fluid, are used to reduce to application consistency, viscous coating materials to allow for their application as liquid sprays. The resulting coating mixtures are sprayed by passing the mixture under pressure through an orifice into the environment of the substrate.

Related U.S. patent application Ser. No. 218,896, filed Jul. 14, 1988, is directed to a process and apparatus for coating substrates by a liquid spray in which; (1) supercritical fluid, such as supercritical carbon dioxide fluid, is used as a viscosity reduction diluent for coating materials; (2) the mixture of supercritical fluid and coating material is passed under pressure through an orifice into the environment of the substrate to form the liquid spray; and (3) the liquid spray is electrically charged by a high electrical voltage relative to the substrate.

Related U.S. patent application Ser. No. 327,484, filed Mar. 22, 1989, is directed to coating materials which are particularly suitable for being admixed with at least one supercritical fluid used as a viscosity reduction diluent and then spraying this resultant coating mixture of supercritical fluid and coating material onto a substrate to be coated.

Related U.S. patent application Ser. No. 327,274, filed Mar. 22, 1989, is directed to coating materials containing water and at least one organic solvent which are particularly suitable for being admixed with at least one supercritical fluid used as a viscosity reduction diluent and then spraying this resultant coating mixture of supercritical fluid and coating material onto a substrate to be coated. Processes for spraying this coating mixture are also disclosed.

Related U.S. patent application Ser. No. 326,945, filed Mar. 22, 1989, is directed to adhesive coating materials which optionally contain water, which are particularly suitable for being admixed with at least one supercritical fluid used as a viscosity reduction diluent and then spraying this resultant coating mixture of supercritical fluid and adhesive coating material onto a substrate to be coated. Processes for spraying these adhesive coating mixtures are also disclosed.

Related U.S. patent application Ser. No. 327,273, filed Mar. 22, 1989, is directed to methods and apparatus for spraying liquid compositions by airless spray techniques which avoid fishtail spray patterns and desirably obtain feathered spray patterns.

Related U.S. patent application Ser. No. 327,275, filed Mar. 22, 1989, is directed to methods and apparatus for spraying liquid compositions by airless spray techniques so as to obtain wider spray patterns without having to alter the construction or configuration of conventional nozzles, nozzle tips or spray guns. By means of the invention disclosed therein, the width of a spray pattern may be changed while the spraying operation is being carried out.

Smith, U.S. Pat. No. 4,582,731, patented Apr. 15, 1986, and U.S. Pat. No. 4,734,451, patented Mar. 29, 1988, disclose a method and apparatus for the deposition of thin films and the formation of powder coatings through the molecular spray of solutes dissolved in organic and supercritical fluid solvents. The concentration of said solutes are described as being quite dilute; on the order of 0.1 percent. In conventional coating applications, the solute concentration is normally 50 times or more greater than this level.

The molecular sprays disclosed in the Smith patents are defined as a spray "of individual molecules (atoms) or very small clusters of solute" which are in the order of about 30 Angstroms in diameter. These "droplets" are more than $10^6$ to $10^9$ less massive than the droplets formed in conventional application methods that Smith refers to as "liquid spray" applications.

Turning more particularly to the aforementioned related U.S. patent application Ser. No. 218,910, a process is disclosed therein where the coating material and carbon dioxide are pumped from separate pressure reservoirs and proportioned by a variable ratio proportioning pump unit which proportions the two fluids together at a given volume ratio by using two piston pumps slaved together. The correctly proportioned coating material and carbon dioxide are then mixed in a static mixer and pumped on demand into a circulation loop, which circulates the coating mixture at spray pressure and temperature to or through the spray gun(s). The coating mixture is heated in an electric heater to obtain the desired spray temperature and filtered in a fluid filter to remove particulates. The circulation flow in the loop is obtained through the use of a gear pump.

An alternative method of proportioning the coating material and supercritical fluid in a continuous mode is by the use of a mass proportionation apparatus, instead of the volumetric proportionation apparatus discussed above, as described in related U.S. patent application Ser. No. 327,273.

As disclosed in the aforementioned related patent applications, the spray pressure used is a function of the coating material, the supercritical fluid being used, and the viscosity of the coating mixture. The minimum spray pressure is at or slightly below the critical pressure of the supercritical fluid. Generally, the pressure will be below 5000 psi. Preferably, the spray pressure is above the critical pressure of the supercritical fluid and typically is below 3000 psi. If the supercritical fluid is supercritical carbon dioxide fluid, the preferred spray pressure is between 1070 psi and 3000 psi. The most preferred spray pressure is between 1200 psi and 2500 psi.

The spray temperature used is a function of the coating material, the supercritical fluid being used, and the concentration of supercritical fluid in the coating mixture. The minimum spray temperature is generally at or slightly below the critical temperature of the supercritical fluid. The maximum temperature is the highest temperature at which the components of the coating mixture are not significantly thermally degraded during the time that the coating mixture is at that temperature.

If the supercritical fluid is supercritical carbon dioxide fluid, because the supercritical fluid escaping from the spray nozzle could cool to the point of condensing solid carbon dioxide and any ambient water vapor present due to high humidity in the surrounding spray environment, the spray composition is preferably heated prior to atomization. The minimum spray temperature is about 31° C. The maximum temperature is determined by the thermal stability of the components in the coating mixture. The preferred spray temperature is between 35° and 90° C.

Generally, liquid mixtures with greater amounts of supercritical carbon dioxide fluid require higher spray temperatures to counteract the greater cooling effect.

Typically the spray undergoes rapid cooling while it is close to the orifice, so the temperature drops rapidly to near or below ambient temperature. If the spray cools below ambient temperature, entrainment of ambient air into the spray warms the spray to ambient or near ambient temperature before the spray reaches the substrate. This rapid cooling of the spray is beneficial because less active solvent evaporates in the spray in comparison to the amount of solvent lost in conventional heated airless sprays. Therefore, a greater proportion of the solvent is retained in the coating material to aid leveling of the coating on the substrate. Conventional heated airless sprays also cool to ambient temperature before reaching the substrate, because of solvent evaporation and entrainment of ambient air.

The spray temperature may be obtained by heating the coating mixture before it enters the spray gun, by heating the spray gun itself, by circulating the heated coating mixture to or through the spray gun to maintain the spray temperature, or by a combination of such methods. Circulating the heated liquid mixture through the spray gun is preferred to avoid heat loss and to maintain the desired spray temperature.

While the use of such a circulation loop to provide multi-passes of the coating mixture through the spray gun, while spraying or not, is advantageous from the point of view of maintaining the coating mixture at a desirable spray temperature or for the continuous mixing of a coating mixture to prevent settling of undissolved constitutents, such as pigments and the like, such a multi-pass mode may not be desirable for all applications. In particular, when utilizing a multi-pass mode, the coating mixture is subjected to a longer period in which it is heated and indeed, some portions of the coating mixture may be heated indefinitely by such continual circulation. If the coating mixture contains heat sensitive or reactive constituents, such a long residence time is clearly undesirable.

So too, a multi-pass circulation loop also requires the utilization of equipment for providing such circulation, e.g., recirculation pump, circulation loop heater, corresponding piping, and the like. This equipment must all be thoroughly cleaned when changing from one coating mixture to another, particularly when changing colors, for example, thereby increasing the risk of cross-contamination. Moreover, this additional equipment also adds to wasted "dead" volume within the overall apparatus since all of the coating mixture contained in the circulation loop must be removed and discarded when changing to a new coating mixture.

It is apparent, therefore, that it would be desirable to utilize a single-pass mode for supplying coating mixture to the spray gun, at least in some applications, in which there is no circulation provided from the spray gun, passed a heater, a static mixer, a circulation pump, and the like, and then back to the spray gun again, on a continuous basis. Such a single-pass mode is particularly desirable for spray operations that require frequent material changes, such as color changes, or use reactive materials or heat sensitive materials. In particular, as a result of using a single-pass mode: 1) the volume of material to be changed is much smaller, which minimizes the amount of waste material created that must ultimately be disposed of; 2) the time required for color changes or cleaning is much shorter, so that paint line speeds can be higher; and 3) the time the material is heated is much less so that reactive and sensitive materials are much less affected before they are sprayed. Such a single-pass mode is also desirable for limited spraying in such applications as fine finishing, automobile refinishing, touch-up, and the like, where a small amount of coating material is used, particularly when utilizing a portable coating operation. Such single-pass systems are common throughout the industry for coating automobiles, airplanes, appliances, machinery, metal furniture, component parts, and other original equipment manufacturing coating operations; for furniture finishing and refinishing; automotive refinishing and touch-up, especially in the small body repair shops; and in small appliance refinishing and touch-up.

We have found, however, that if the apparatus disclosed in the aforementioned related applications were modified so as to convert the multi-pass mode to a single-pass mode, the resulting spray would generally provide poor atomization which, in turn, would produce a coating on the substrate of poor quality. More specifically, we have found that such poor atomization is directly attributable to spraying the coating mixture at too low a spraying temperature which spraying temperature is decreased by a number of factors heretofore unknown.

Thus, as briefly noted above, the spray temperature is a function of the coating meterial being used, the supercritical fluid being used, and the concentration of such supercritical fluid in the coating mixture. Keeping these variables constant, proper atomization is obtained when the spray temperature is such that fine liquid droplets are obtained generally having an average diameter of one micron or greater. Preferably, these droplets have average diameters of from about 5 to about 1000 microns.

Such proper atomization can easily be observed by the shape and pattern of the spray that is produced signifying that the proper spray temperature is being maintained as the coating mixture is sprayed. In particular, as disclosed in related U.S. patent application Ser. No. 327,273, filed Mar. 22, 1989, a feathered spray pattern is clearly observed when proper atomization of the coating mixture is being obtained in contrast to a typical fishtail pattern. So too, as also disclosed in related U.S. patent application Ser. No. 327,275, filed Mar. 22, 1989, during proper atomization of the coating mixture, it can also be observed that the width of the spray fan is generally much wider than that which would be expected for the particular spray tip being used.

In other words, when a single-pass mode is substituted for a multi-pass mode, we have found that the spray that is produced is not in a feathered spray pattern, and is not wider than that which would be expected, either one of which would indicate that proper atomization is not taking place. Such poor atomization generally indicates that the spray droplets being produced are larger than that desired which, in turn, produces poor quality coatings.

In particular, we have found, when spraying coating mixtures that contain supercritical fluids, such as carbon dioxide, that the spray mixture experiences adverse heat loss when using spray guns with single-pass flow of the coating mixture. We have discovered that the heat loss occurs both from within the gun and from the feeding means which supplies the coating mixture to the spray gun after being heated to the desired temperature. This heat loss, we have discovered, causes the spray temperature to be less than that required to provide proper atomization, as reflected by, for example, the lack of obtaining a feathered spray pattern. Without proper atomization, poor coating quality is obtained.

We have also found that heating the coating mixture to a higher temperature in the heater to compensate for such heat loss is inadequate when the spray is intermittent and not continuous. Steady-state is not obtained and consequently, the spray temperature will fluctuate as the spray is turned on and off. Furthermore, some heat-sensitive coatings cannot tolerate being heated to a higher temperature.

Moreover, at start-up, the heated spray mixture must be purged through the gun to first heat the gun and the feed line, which subjects the spray mixture to an even larger temperature drop than during normal spraying. This purging also wastes coating material and creates a waste disposal problem. It is clear that in the non-circulating, single-pass mode of airless spraying of coating formulations containing supercritical fluids where temperatures must be maintained and controlled to be near or above the critical temperature of the supercritical fluid, which may be above ambient temperature, that presently available commercial spray guns are inadequate and there is a need for improved apparatus and processes which would provide heating of the spray gun and the feed lines by a means other than with the coating mixture itself.

Still further, in contrast to circulating the coating mixture to and from the spray gun as the mixture is being sprayed to provide for continuous mixing and heating, we have found that a single-pass spray gun system has a tendency to allow the settling of non-dissolved components of the coating mixture, such as pigments, metallic flakes and the like. Hence, there is also a need for a means of maintaining the homogeneity of the coating mixture during single-pass operation in addition to the need for maintaining a given temperature level.

Furthermore, when using a single-pass mode or even when using the multi-pass mode disclosed in the aforementioned related applications, we have also noted that, at times, deterioration of the spraying occurs as more and more substrate is sprayed. When spraying first starts, good results are obtained. As spraying continues, however, the spray pattern appears to change getting coarser, which results in the substrate having less than desirable quality. The most notable aberration is "orange peel," which is the formation of circular crater-like formations. Although the film obtained is a continuous one, with the substrate being completely coated, the film is uneven in film thickness, having a dimpled surface. This orange peel condition results in poor gloss and poor distinctness of image. We have discovered that this phenomenon is apparently caused by the cooling of the spray gun nozzle assembly, which includes the spray tip, as spraying is continued over a relatively extended period of time, regardless of whether there is a circulation loop or not.

Particularly, we found that when heated liquid spray mixtures containing supercritical fluid such as carbon dioxide are sprayed through an airless spray nozzle, even with circulation of the liquid mixture through the spray gun, the spray nozzle undergoes cooling, i.e., the spray nozzle temperature drops during spraying.

In conventional heated airless spraying, with circulation of the spray mixture to and through the spray gun, it is expected and observed that after the start of spraying, the spray gun nozzle temperature increases to the temperature inside the gun and substantially maintains that temperature throughout spraying. Since the solvents included in conventional spray mixtures are liquids at abmient conditions and therefore have relatively low vapor pressures, it is not expected by one skilled in the art to observe spray gun nozzle temperature decrease while the coating mixture is under pressure in the spray gun nozzle due to an evaporative cooling phenomenon.

However, when spraying a coating mixture containing a supercritical fluid, as in the present invention, we theorize that nozzle cooling is caused by the supercritical fluid, e.g., carbon dioxide, vaporizing inside the spray nozzle before exiting the orifice. In particular, we believe that the spray mixture undergoes a pressure drop inside the spray gun and, more specifically, inside of the spray nozzle. This pressure drop may be caused by the coating mixture, containing the supercritical fluid, flowing through contractions and expansions such as the valve channel, slots, flow splitters, and chambers in the gun and nozzle downstream of the valve, and turbulence promoters such as diffuser pre-orifices which are typically found in state-of-the-art spray guns. Very large pressure drop occurs as the coating mixture passes through the orifice in the spray tip, which causes rapid cooling as the supercritical fluid rapidly vaporizes from solution. Accordingly, we have discovered that providing a means for heating the spray nozzle would help eliminate these problems.

Still further, when utilizing the apparatus and methods disclosed in the aforementioned related patent applications, we have also noted that when the spraying of a substrate is halted, coating mixture may still "spit" or "ooze" out of the spray nozzle of the spray gun despite the fact that the spray gun has been shut off. This released material may undesirably be entrained into the spray as large droplets when spraying is resumed thereby marring the resulting coating. Alternatively, this spitting of the large droplets may mar the coating directly during flow shut off. Without wishing to be bound by theory, we believe that such "spitting" or "oozing" is being caused by vaporization of the supercritical fluid inside the spray nozzle when the flow valve closes and the coating mixture inside the spray nozzle is quickly depressurized to atmospheric pressure. This is believed caused by the flow of coating mixture which still occurs between the valve located inside of the spray gun and the orifice in the spray tip even when the valve is shut.

Normal or conventional spray materials comprise relatively incompressible liquids and their solvents have relatively low vapor pressures, so little change in volume occurs during depressurization. However, spray solutions that contain carbon dioxide or other supercritical fluids as a solvent are compressible and have a high vapor pressure. Consequently, a large increase in volume occurs during depressurization as the supercritical fluid comes out of solution and expands as a gas. It is this expansion of the coating mixture which we believe causes the material to "spit" or "ooze" out of the spray nozzle. This phenomenon also causes significant cooling of the spray nozzle and the coating mixture left inside it, which causes improper spray atomization when spraying is resumed because proper spray temperature is not maintained. When valving is rapid, this cooling phenomenon can cause noticeable progressive deterioration of the spray and coating such as increased orange peel. The more volume that is present between the inlet valve and the spray tip, the more undesirable evaporative cooling that occurs.

Accordingly, we have also recognized that what is additionally needed is a spray gun design in which there is a reduction of the volume of material remaining downstream of the shut-off valve once spraying has been stopped. Commercially available airless spray gun nozzle assemblies contain enough void volume to cause the said spitting and oozing. Commercially available spray nozzle inserts, such as Spraying Systems No. 15153-NY insert for Airless TC Nozzles, are known to those skilled in the art, but such an insert does not solve the problem, although, it does reduce it somewhat.

Hence, in order to help solve all of the problems that we have now recognized, what is needed is: 1) a means for heating the spray gun and its feed hose, while desirably also providing for in-spray gun mixing; 2) a means of increasing the temperature of the spray nozzle tip; and 3) a means for minimizing the flow volume between the flow valve and the spray orifice of the spray gun. An apparatus which meets these needs would then be able to maintain the proper temperature and homogeneity of the coating mixture required for the proper atomization of the spray mixture, and would also help minimize the material that "spits" of "oozes" out of this cavity when the flow valve is closed. Such an apparatus would thereby help avoid the production of undesirable coatings on the substrate.

None of the problems that we have recognized can be solved using wholly conventionally available spray equipment designed for use with non-compressible fluids.

SUMMARY OF THE INVENTION

By virtue of the present invention, apparatus and methods have been discovered which have substantailly eliminated the above-noted problems. Thus, by the apparatus of the present invention, means have now been provided which maintain the spray temperature of the coating mixture, whether sprayed in a single-pass or multi-pass mode, such that proper atomization is provided which is manifested by obtaining a feathered spray pattern.

Thus, in the broader embodiment of the present invention, the apparatus can be described as an apparatus for spraying a coating mixture comprising coating material and supercritical fluid in which the coating mixture, at a temperature $T°$, is fed through a feeding means to a spray gun from which the coating mixture is sprayed in a feathered spray pattern, the improvement which comprises providing means within the spray gun or means in combination with the spray gun and the feeding means to maintain the temperature of the coating mixture at a temperature which is substantially equal to or greater than temperature $T°$ such that a feathered spray pattern is maintained as the coating mixture is sprayed. As used herein, it is to be understood that the term "feeding means" is meant to include the conduit(s), such as hoses or pipes, and the like, which deliver coating mixture or coating material to the spray gun.

More particularly, in one embodiment of the present invention, a heated, temperature controlled circulating heat transfer fluid is provided to the hoses and conduits which supply coating mixture to the spray gun so as to help maintain the proper spray temperature. In a preferred embodiment, the hoses carrying coating mixture are juxtaposed to other conduits which are carrying heat transfer fluid, wherein all of the hoses and conduits are contained within an overall conduit which may be insulated, if desired.

Specifically, this embodiment is an apparatus for spraying a coating mixture comprising coating material and supercritical fluid in a feathered spray pattern at a temperature effective to provide such a feathered spray pattern which comprises means for supplying coating mixture to a feeding means, which feeding means supplies the coating mixture to a spray gun from which the coating mixture is sprayed in a feathered spray pattern, and which feeding means comprises a plurality of conduits which are juxtaposed to one another and contained within an overall conduit, at least one or more of the plurality of conduits containing coating mixture and at least one or more of the plurality of conduits containing circulating heat transfer fluid for providing indirect heat exchange to the coating mixture so as to maintain the temperature in the coating mixture effective to provide the feathered spray pattern. Of course, it is also possible to pass coating material through the heated feeding means which coating material is then admixed with supercritical fluid while still in the feeding means so as to form coating mixture which is then introduced into the spray gun.

In another embodiment of the present invention, heat transfer fluid may also be provided to the spray gun so as to counteract the effects of heat loss occuring in the spray gun, particularly during single-pass operation. This embodiment may be characterized as an apparatus for spraying a coating mixture comprising coating material and supercritical fluid in a feathered spray pattern at a temperature effective to provide such a feathered spray pattern which comprises means for supplying coating mixture to a spray gun from which the coating mixture is sprayed in a feathered spray pattern, and which spray gun comprises a housing, an inlet means within said housing through which the coating mixture is passed into said gun, and a passageway for the flow of coating mixture communicating between said inlet means and a valve means through which the coating mixture is passed to a spray orifice means from which the coating mixture leaves said gun as a feathered spray, said housing of the spray gun containing passages for circulation of a heat transfer fluid for providing indirect heat exchange to the coating mixture as it flows in said passageway so as to at least maintain the temperature T° in the coating mixture effective to provide the feathered spray pattern.

In yet another embodiment of the present invention, a heating means is provided to the nozzle assembly of the spray gun which contains the spray orifice tip to offset heat loss caused by evaporative cooling associated with the expansion of the compressible supercritical fluid in the spray nozzle assembly. In particular, this embodiment includes an apparatus for spraying a coating mixture comprising coating material and supercritical fluid in a feathered spray pattern at a temperature effective to provide such a feathered spray pattern which comprises means for supplying coating mixture to a spray gun from which the coating mixture is sprayed in a feathered spray pattern, and which spray gun comprises a housing, an inlet means within said housing through which the coating mixture is passed into said gun, and a passageway for the flow of coating mixture communicating between said inlet means and a valve means through which the coating mixture is passed to a spray orifice means from which the coating mixture leaves said gun as a feathered spray, said spray orifice means further comprising a nozzle assembly containing a spray orifice tip which nozzle assembly is provided with a heating means located in or on said nozzle assembly for providing indirect heat exchange to the coating mixture so as to at least maintain the temperature T° in the coating mixture effective to provide the feathered spray pattern.

In a further embodiment of the present invention, in order to minimize "oozing" and "spitting" and to compensate for cooling caused by quick depressurization of coating mixture while in the spray gun after the spray gun is shut off, the volume of the passageway leading from the shut-off valve to the spray orifice tip is reduced. This embodiment is characterized as an apparatus for spraying a coating mixture comprising coating material and supercritical fluid in a feathered spray pattern at a temperature effective to provide such a feathered spray pattern which comprises means for supplying coating mixture to a spray gun from which the coating mixture is sprayed in a feathered spray pattern, and which spray gun comprises a housing, an inlet means within said housing through which the coating mixture is passed into said gun, a first passageway for the flow of coating mixture communicating between said inlet means and a valve means through which the coating mixture is passed to a spray orifice means from which the coating mixture leaves said gun as a feathered spray, and a second passageway for the flow of coating mixture communicating between the valve means and the spray orifice means, and wherein said second passageway contains an insert having a channel to accommodate the flow of coating mixture as it passes from the valve means to the spray orifice means, said insert effectively reducing the volume of said second passageway thereby helping to at least maintain the temperature T° in the coating mixture effective to provide the feathered spray pattern.

An alternative to this embodiment is characterized as an apparatus for spraying a coating mixture comprising coating material and supercritical fluid in a feathered spray pattern at a temperature effective to provide such a feathered spray pattern which comprises means for supplying coating mixture to a spray gun from which the coating mixture is sprayed in a feathered spray pattern, and which spray gun comprises a housing, an inlet means within said housing through which the coating mixture is passed into said gun, a first passageway for the flow of coating mixture communicating between said inlet means and a valve means through which the coating mixture is passed to a spray orifice means from which the coating mixture leaves said gun as a feathered spray, and a second passageway for the flow of coating mixture communicating between the valve means and the spray orifice means, and wherein said valve means is provided with a valve seat which is juxtaposed to a spray orifice tip located in the spray orifice means to thereby reduce the volume of said second passageway and help maintain the temperature T° in the coating mixture effective to provide the feathered spray pattern.

In a still further embodiment, a static mixer is incorporated into the spray gun. More specifically, this embodiment is characterized by an apparatus for spraying a coating mixture comprising coating material and supercritical fluid in a feathered spray pattern at a temperature effective to provide such a feathered spray pattern which comprises means for supplying coating mixture to a feeding means, which feeding means supplies the coating mixture to a spray gun from which the coating mixture is sprayed in a feathered spray pattern, and which spray gun comprises a housing, an inlet means within said housing through which the coating mixture is passed into said gun, and a passageway for the flow of coating mixture communicating between said inlet means and a valve means through which the coating mixture is passed to a spray orifice means from which the coating mixture leaves said gun as a feathered spray, said passageway being provided with a static mixer through which the coating mixture passes to help maintain at least the temperature T° in the coating mixture effective to provide the feathered spray pattern.

The inclusion of a mixer within the spray gun provides a number of distinct advantages. Firstly, it provides the ability, if desired, to mix the supercritical fluid with the coating material in the spray gun. Secondly, in systems which contain reactive components in the coating material, such as polyester/polyisocyanates which form urethanes or monomer/catalysts which form polymers, it is desirable to mix such components as late in the process as possible to prevent premature reaction. Similarly, when utilizing temperature sensitive components, such delayed mixing, just prior to spraying, would also be desirable.

In addition, the provision of a mixer within the spray gun also provides for better heat transfer to the coating mixture when the spray gun is heated by facilitating more surface area of the coating mixture to indirect heat exchange by the heat transfer fluid as it passes through the gun. Furthermore, the mixer provides for more uniform heating of the coating mixture as the heated outer portion of the flowing mixture is mixed with the unheated inner portion of the mixture as it flows through the gun. This is particularly advantageous for polymeric solutions that are thermally insulating and do not readily conduct heat.

Accordingly, in an alternative embodiment of the present invention, a spray gun is disclosed comprising a housing, an inlet means within said housing through which one or more fluids are passed into said gun, an outlet means through which the one or more fluids leave said gun, and a passageway communicating between said inlet means and outlet means, said passageway being provided with a static mixer through which the one or more fluids are passed to effectively mix said fluids with one another. In a more preferred embodiment, the one or more fluids entering said gun includes coating material and supercritical fluid which are admixed in said gun to form coating mixture. Alternatively, one or more fluids containing reactive components may also separately be introduced into the spray gun so as to be admixed therein. These fluids containing reactive components may include supercritical fluid or the supercritical fluid may also separately be introduced into the spray gun.

In connection with the foregoing embodiments of the present invention, providing heated coating mixture to a spray gun by connecting a circulation adapter (t-connector) to the fluid inlet of the gun, which allows heated coating mixture to be circulated to the gun inlet, past the gun, and returned to a heater, is well known and commercially available. While this helps to minimize heat losses in the feed line to the spray gun, it does not, however, affect heat losses within the gun or the feed line from the adaper. Furthermore, it cannot be used in the single-pass mode.

For additional heat input, airless spray guns are commercially available that have a fluid inlet and a fluid outlet that allows heated coating mixture to continually circulate through the spray gun and back to the heater. These include hand spray guns such as Binks Model 1H, Graco Model 214-973, and Nordson Model A4B, and automatic spray guns such as Binks Model 560, Graco Model 205-938, Graco Model 218-152 with air assist, Nordson Model A7A, and Spraying Systems Model 24AUA-8395. None of these spray guns have electrostatic capabilities. Only a limited number of commercially available electrostatic airless spray guns circulate heated coating mixture through at least part of the spray gun. These are Nordson Model C-1 hand spray gun and Models CA-1 and CA-10 automatic spray guns. However, these guns only circulate coating material through the metal inlet body and not through the long electrically insulating plastic extension that the coating passes through to reach the spray nozzle. Significant cooling can therefore occur in this extension despite the circulation through the metal body.

These designs are not adaptable to a single-pass spray gun which we have determined requires heating capability, exclusive of the coating mixture itself, to maintain such coating mixture at the desired temperature for spraying. However, heating a spray gun with a material other than the material to be sprayed is not presently available in commercially obtainable spray guns. Consequently, a need exists for such an improved spray gun.

So too, U.S. Pat. No. 4,522,789, issued Jun. 11, 1985, describes an apparatus whereby a mixer is adjoined to the handle of a single-pass spray gun. This apparatus, however, is still deficient in that it would leave material in the spray gun between periods when the gun is not actively spraying. This could result in the settling of the constitutents from the mixture while it is present in the gun and thereby cause non-homogeneity, affecting the quality of the coating application.

Various apparatus are known to those skilled in the art for dispensing or spraying a plurality of fluids. One apparatus described in U.S. Pat. No. 3,330,484, issued Jul. 11, 1967, internally mixes a plurality of fluids, including atomizing air to provide the spraying energy, in a grid mixing chamber with a removable baffle with radially disposed openings between the surrounding chamber and the interior of the mixing tube.

Another apparatus, described in U.S. Pat. No. 3,759,450, issued Sep. 18, 1973, provides a fluid mixing and spraying apparatus which includes a diffuser which divides a first fluid into a plurality of fluid streams which pass from the diffuser at an angle to the longitudinal axis of a chamber in which the diffuser is located, and which divides the second fluid into a plurality of fluid streams which pass from the diffuser substantially parallel to the axis of the chamber and then mixing in an elongated chamber. Baffle means may also be provided in the elongated chamber where the two fluids first meet.

Both of the aforementioned mixing apparatus, by the very nature of their designs, have many tortuous paths, including many mechanical bends, baffles, sharp contractions and enlargements in the plurality of chambers through which the fluids flow and are mixed, which undesirably may cause fluid pressure loss. Indeed, it can be expected that turbulence is promoted by such apparatus. While such phenomena may enhance the mixing of non-compressible fluids, where compressible supercritical fluid comprises at least one of the fluids in the coating mixture to be sprayed, as is true of the present invention, such phenomena in the spraying and mixing apparatus are detrimental. The fluids attempted to be mixed in such a fashion would experience permanent pressure loss, or drop, which, in this case, may cause the supercritical fluid to come out of solution prematurely before reaching the atomization orifice or, indeed, never becoming well mixed. This would adversely affect the quality of atomization and the subsequent coating of the substrate.

Electrical heating is well known to those skilled in the art as a method for heating fluids in conduits and apparatus. Prior art which particularly relates to coatings, in addition to the Smith patents mentioned earlier, include U.S. Pat. No. 3,835,294, issued Sep. 10, 1974; U.S. Pat. No. 3,876,363, issued Apr. 8, 1975; and U.S. Pat. No. 4,383,645, issued May 17, 1983. None of these patents discuss an embodiment in which the spraying apparatus itself is specifically heated. Instead, they disclose apparatus which preheats the fluid to be sprayed prior to the spray nozzle and/or orifice.

Yet another heating device, an electrically heated spray nozzle, is disclosed in U.S. Pat. No. 4,644,140, issued Feb. 17, 1987. This patent discloses a heated nozzle, or injection jet, such as for spraying plastics, wherein a highly compressed tubular heating body wound about the nozzle, such as a coil, is comprised of a tubular steel inner jacket containing a pair of spaced electrical heating elements embedded in a highly compressed powdered insulating material; a copper outer jacket encases the inner jacket and a hard solder connection joins the outer jacket to the body of the nozzle. This apparatus is believed to be inefficient and deemed costly inasmuch as only about 25% of the heat generated is actually transferred to the spray nozzle with the remaining heat being lost to the environment. In addition, corrosion through electrochemical phenomenon could also present a problem in the apparatus disclosed in the said patent since dissimilar metals are in contact and joined through the hard solder connection to the nozzle.

Moreover, electrical resistant heaters, such as those disclosed in U.S. Pat. No. 4,644,140, issued Feb. 17, 1987, have been known to those skilled in the art as a means for electrically heating spray nozzles. However, the heating coil arrangement disclosed in the U.S. Pat. No. 4,644,140 provides for and limits direct heat contact and transfer to only the nozzle body thereby focusing away from the specific need that we have identified for nozzle tip heating. As disclosed in this patent, the region closely adjacent to the nozzle orifice path, and specifically the tip, is not provided with direct heater contact and yet, this is exactly the region where we have discovered the undesirable evaporative cooling phenomenon. In short, what is needed to overcome this problem, as we have recognized, is specifically locating a heating apparatus on the front-end of a spray nozzle assembly of a spray gun in the proximity of and in communication with the spray tip orifice area, as the coating material is discharged therefrom, such that thermal counteraction to the spray nozzle orifice pressure drop and evaporative cooling phenomenon is effected.

BRIEF DESCRIPTION OF THE DRAWINGS

FIG. 2 shows an isometric view, in partial cutaway, of an embodiment of a heated hose assembly construction in accordance with the present invention which is shown symbolically in FIG. 1.

FIG. 3 is a longitudinal cross-sectional view of an embodiment of a single-pass spray gun shown symbolically in FIG. 1.

FIG. 5 is a longitudinal cross-sectional view of an embodiment of the present invention of an electrostatic single-pass spray gun having a heating element.

FIG. 7 is a longitudinal cross-sectional view of a heating element that can be used with the spray gun shown in FIG. 5.

FIG. 9 is a longitudinal cross-sectional view of another embodiment of the present invention in which an electrostatic single-pass spray gun is shown having channels for heating the coating mixture by heat transfer fluid.

FIG. 10 is a longitudinal cross-sectional view showing the bottom of the spray gun of FIG. 9.

FIG. 20 shows an isometric view of the static mixer assembly shown in cross-section in FIG. 19.

FIG. 28 is a partial cross-sectional view showing a prior art spray nozzle and valve apparatus which is not in accordance with the present invention.

FIG. 29 is a side view of a one-piece nozzle tip and valve seat of another embodiment of the present invention.

FIG. 30 is a longitudinal cross-sectional view of the tip and seat piece shown in FIG. 29 taken along 17—17 of FIG. 29.

FIGS. 31 and 32 are opposite end views of the tip and valve piece shown in FIG. 29 viewed along the planes of lines 18—18 and 19—19, respectively.

FIG. 33 is a longitudinal cross-section of a nozzle assembly and retaining nut showing the tip and valve piece of FIG. 29, positioned within the spray gun apparatus.

FIGS. 36a and 36b illustrate typical feathered spray fans with FIG. 36c showing the absence of a visible liquid film at the spray nozzle due to the explosive atomization characteristic of the feathered spray. FIG. 36d shows a narrower feathered fan with FIG. 36e showing the spray in FIG. 36d after rotating the plane of the spray by 90 degrees.

FIGS. 37a-37d are photoreproductions of actual atomized liquid sprays containing a fishtail spray pattern which is not in accordance with the objectives of the present invention.

DETAILED DESCRIPTION OF THE INVENTION

Figure 1:
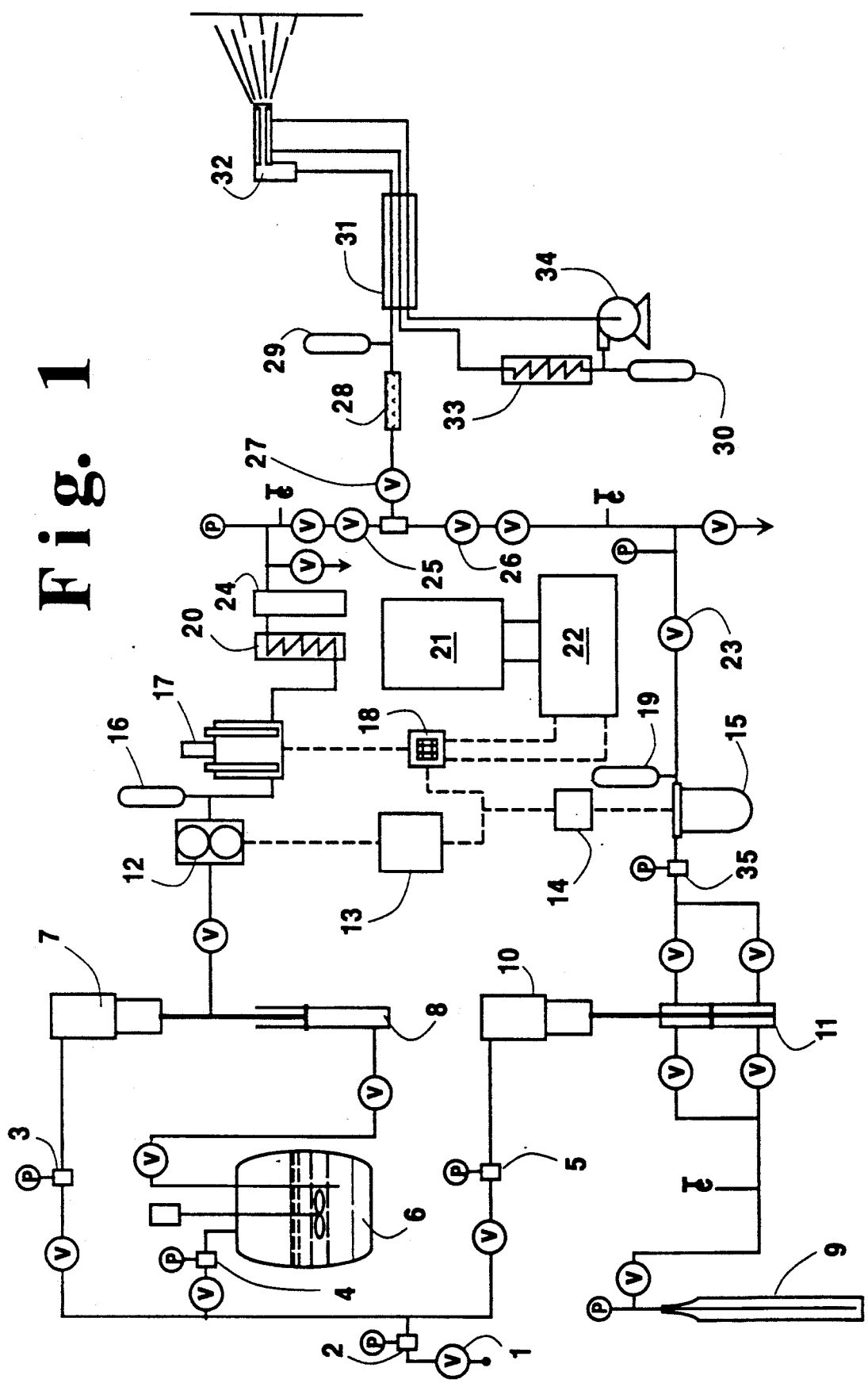
FIG. 1 is a schematic diagram of a single-pass spray apparatus with a heated hose and gun that can be used in the practice of the present invention.

Because of its importance, a brief discussion of relevant supercritical fluid phenomena is warranted. Supercritical fluid phenomenon is well documented, see pages F-62 -F-64 of the CRC Handbook of Chemistry and Physics, 67th Edition, 1986-1987, published by the CRC Press, Inc., Boca Raton, Fla. At high pressures above the critical point, the resulting supercritical fluid, or "dense gas", will attain densities approaching those of a liquid and will assume some of the properties of a liquid. These properties are dependent upon the fluid composition, temperature, and pressure.

The compressibility of supercritical fluids is great just above the critical temperature where small changes in pressure result in large changes in the density of the supercritical fluid. The "liquid-like" behavior of a supercritical fluid at higher pressures results in greatly enhanced solubilizing capabilities compared to those of the "subcritical" compound, with higher diffusion coefficients and an extended useful temperature range compared to liquids. Compounds of high molecular weight can often be dissolved in the supercritical fluid at relatively low temperatures. An interesting phenomenon associated with supercritical fluids is the occurrence of a "threshold pressure" for solubility of a high molecular weight solute. As the pressure is increased, the solubility of the solute will often increase by many orders of magnitude with only a small pressure increase.

Near-supercritical liquids also demonstrate solubility characteristics and other pertinent properties similar to those of supercritical fluids. The solute may be a liquid at the supercritical temperatures, even though it is a solid at lower temperatures. In addition, it has been demonstrated that fluid "modifiers" can often alter supercritical fluid properties significantly, even in relatively low concentrations, greatly increasing solubility for sold solutes. These variations are considered to be within the concept of a supercritical fluid.

Therefore, as used herein, the phrase "supercritical fluid" denotes a compound above, at, or slightly below the critical temperature and pressure (the critical point) of that compound. Examples of compounds which are known to have utility as supercritical fluids are given in Table 1.

TABLE 1

EXAMPLES OF SUPERCRITICAL SOLVENTS

| Compound | Boiling Point (°C.) | Critical Temperature (°C.) | Critical Pressure (atm) | Critical Density (g/cm$^3$) |
|---|---|---|---|---|
| $CO_2$ | −78.5 | 31.3 | 72.9 | 0.448 |
| $NH_3$ | −33.35 | 132.4 | 112.5 | 0.235 |
| $H_2O$ | 100.00 | 374.15 | 218.3 | 0.315 |
| $N_2O$ | −88.56 | 36.5 | 71.7 | 0.45 |
| Xenon | −108.3 | 16.6 | 57.6 | 0.118 |
| Krypton | −153.2 | −63.8 | 54.3 | 0.091 |
| Methane | −164.00 | −82.1 | 45.8 | 0.2 |
| Ethane | −88.63 | 32.28 | 48.1 | 0.203 |
| Ethylene | −103.7 | 9.21 | 49.7 | 0.218 |
| Propane | −42.1 | 96.67 | 41.9 | 0.217 |
| pentane | 36.1 | 196.6 | 33.3 | 0.232 |
| Methanol | 64.7 | 240.5 | 78.9 | 0.272 |
| Ethanol | 78.5 | 243.0 | 63.0 | 0.276 |
| Isopropanol | 82.5 | 235.3 | 47.0 | 0.273 |
| Isobutanol | 108.0 | 275.0 | 42.4 | 0.272 |
| Chlorotrifluoromethane | −31.2 | 28.0 | 38.7 | 0.579 |
| Monofluoromethane | −78.4 | 44.6 | 58.0 | 0.3 |
| Cyclohexanol | 155.65 | 356.0 | 38.0 | 0.273 |

Due to the low cost, environmental acceptability, non-flammability and low critical temperature of carbon dioxide, supercritical carbon dioxide fluid is preferably used with the coating formulations. For many of the same reasons, nitrous oxide ($N_2O$) is a desirable supercritical fluid for admixture with the coating formulations. However, any of the aforementioned supercritical fluids and mixtures thereof are to be considered as being applicable for use with the coating formulations.

The solvency of supercritical carbon dioxide is substantially similar to that of a lower aliphatic hydrocarbon and, as a result, one can consider supercritical carbon dioxide as a replacement for the hydrocarbon solvent of a conventional coating formulation. In addition to the environmental benefit of replacing hydrocarbon solvents with supercritical carbon dioxide, there is a safety benefit also, because carbon dioxide is non-flammable.

Due to the solvency of the supercritical fluid with the coating formulations, a single phase liquid mixture is able to be formed which is not only capable of being sprayed by airless spray techniques but which forms the desired feathered spray pattern.

None of the prior art coating compositions have been formulated with the intent of having these compositions combined with a supercritical fluid as a diluent and then spraying the resultant coating mixture through an orifice and onto a substrate to form a liquid coating which is then dried and/or cured.

Indeed, prior to the inventions described in the above-noted related applications, it was unknown how a high concentration of highly volatile supercritical fluid, such as supercritical carbon dioxide fluid, would affect formation of a liquid spray containing a solids fraction; a diluent fraction in which said solids fraction is dissolved, suspended or dispersed, and a portion of the supercritical fluid. A spray mixture undergoes a large and rapid drop in pressure as it goes through the orifice. Accordingly, one of ordinary skill in the art could theorize that the supercritical spray mixture would produce a foam like shaving cream instead of a spray, because nucleation to form gas bubbles would be so rapid and intense. Alternatively, one of ordinary skill in the art could also expect that the spray mixture would produce a mist or fog of microdroplets instead of a spray, because atomization would be so intense. Another result that could be theorized by one skilled in the art is that the spray mixture would produce a spray of bubbles instead of droplets. Furthermore, even if a spray were formed, it would have been expected by one skilled in the art that the sudden and intense cooling that accompanies rapid depressurization and expansion of a supercritical fluid would cause the liquid droplets to freeze solid. For example, it is commonly known that the spray from carbon dioxide fire extinguishers produces solid dry ice particles.

In the event that formation of a liquid spray were achieved, there is no assurance that the spray could be used to produce quality coherent polymeric coatings on a substrate. One of ordinary skill in the art could surmise that the liquid droplets would be so small or have so little momentum that they could not be deposited well onto the substrate. One could also theorize that foaming droplets of supercritical fluid dissolved in the coating would produce a layer of foam on the substrate or a coating full of bubbles when these characteristics were not desired in the coating. The liquid coating droplets that are deposited onto the substrate would have a much higher viscosity than the material that was sprayed, because they would have lost most of the supercritical fluid diluent and they would be at a lower temperature. Furthermore, the coating material would contain less volatile organic solvent than normal. Therefore, it is not unreasonable to expect that higher viscosity would prevent or hinder coalescence of the deposited droplets to form a coherent liquid coating; that it would reduce how much the droplets spread out on the substrate, so that thin coatings could not be produced; and that it would reduce the surface flow that produces a smooth coating. One can further theorize that moisture would condense onto the droplets and harm the coating, because the spray would be cooled below the dew point.

Surprisingly, however, it has been shown, as discussed in U.S. Pat. No. 4,923,720 noted above, that liquid sprays can indeed be formed by using supercritical fluids as viscosity reduction diluents and that such sprays can be used to deposit quality coherent polymeric coatings onto substrates.

As discussed in the aforementioned related applications, the processes for using supercritical fluids as viscosity reducing diluents are not narrowly critical to the type of coating materials that can be sprayed provided that there is less than about 30% by weight of water in the diluent fraction of the coating matieral. Thus, essentially any coating material meeting the aforementioned water limit requirement which is conventionally sprayed with an air spray or airless spray technique may also be sprayed by means of the methods and apparatus discussed herein.

Such coating materials are typically used for painting and finishing operations or for applying various adhesives compositions, and the like. Such coating materials may also include those that are typically utilized in the agricultural field in which fertilizers, weed killing agents, and the like are dispensed.

Generally, such coating materials typically include a solids fraction containing at least one component which is capable of forming a coating on a substrate, whether such component is an adhesive, a paint, lacquer, varnish, chemical agent, lubricant, protective oil, non-aqueous detergent, or the like. Typically, at least one component is a polymer component which is well known to those skilled in the coatings art.

The constituents used in the solids fraction, such as the polymers, generally must be able to withstand the temperatures and/or pressures which are involved when they are ultimately admixed with the at least one supercritical fluid. Such applicable polymers include thermoplastic or thermosetting materials or may be crosslinkable film forming systems.

In particular, the polymeric components include vinyl, acrylic, styrenic, and interpolymers of the base vinyl, acrylic, and styrenic monomers; polyesters, oil-free alkyds, alkyds, and the like; polyurethanes, oil-modified polyurethanes and thermoplastic urethanes systems; epoxy systems; phenolic systems; cellulosic esters such as acetate butyrate, acetate propionate, and nitrocellulose; amino resins such as urea formaldehyde, melamine formaldehyde, and other aminoplast polymers and resins materials; natural gums and resins; rubber-based adhesives including nitrile rubbers which are copolymers of unsaturated nitriles with dienes, styrene-butadiene rubbers, thermoplastic rubbers, neoprene or polychloroprene rubbers, and the like.

In addition to the polymeric compound that may be contained in the solids fractions, conventional additives which are typically utilized in coatings may also be used. For example, pigments, pigment extenders, metallic flakes, fillers, drying agents, anti-foaming agents, and anti-skinning agents, wetting agents, ultraviolet absorbers, cross-linking agents, and mixtures thereof, may all be utilized in the coating material to be sprayed.

In connection with the use of the various additives noted above, it is particularly desirable for pigments to be present in the coating material inasmuch as it has been found to aid atomization.

In addition to the solids fraction, a solvent fraction is also typically employed in the coating materials whether they be an adhesive composition or a paint, lacquer, varnish, or the like, or an agricultural spray, in order to act as a vehicle in which the solid fraction is transported from one medium to another. As used herein, the solvent fraction is comprised of essentially any active organic solvent and/or non-aqueous diluent which is at least partially miscible with the solids fraction so as to form either a solution, dispersion, or suspension. As used herein, an "active solvent" is a solvent in which the solids fraction is at least partially soluble. The selection of a particular solvent fraction for a given solids fraction in order to form a specific coating material for application by airless spray techniques is conventional and well known to those skilled in the art. In general, up to about 30% by weight of water, preferably up to about 20% by weight, may also be present in the solvent fraction provided that a coupling solvent is also present in the material. All such solvent fractions are suitable.

A coupling-solvent is a solvent in which the polymeric compounds used in the solids fraction is at least partially soluble. Most importantly, however, such a coupling solvent is also at least partially miscible with water. Thus, the coupling solvent enables the miscibility of the solids fraction, the solvent fraction and the water to the extent that a single phase is desirably maintained such that the composition may optimally be sprayed and a good coating formed.

Coupling solvents are well known to those skilled in the art and any conventional coupling solvents which are able to meet the aforementioned characteristics, namely, those in which the polymeric components of the solid fraction are at least partially soluble and in which water is at least partially miscible are all suitable for being used.

Applicable coupling solvents which may be used include, but are not limited to, ethylene glycol ethers; propylene glycol ethers; chemical and physical combinations thereof; lactams; cyclic ureas; and the like.

Specific coupling solvents (which are listed in order of most effectiveness to least effectiveness) include butoxy ethanol, propoxy ethanol, hexoxy ethanol, isopropoxy 2-propanol, butoxy 2-propanol, propoxy 2-propanol, tertiary butoxy 2-propanol, ethoxy ethanol, butoxy ethoxy ethanol, propoxy ethoxy ethanol, hexoxy ethoxy ethanol, methoxy ethanol, methoxy 2-propanol, and ethoxy ethanol. Also included are lactams such as n-methyl-2-pyrrolidone, and cyclic ureas such as dimethyl ethylene urea.

When water is not present in the coating material, a coupling solvent is not necessary, but may still be employed. Other solvents, particularly active solvents, which may be present in typical coating materials and which may be utilized include ketones such as acetone, methyl ethyl ketone, methyl isobutyl ketone, mesityl oxide, methyl amyl ketone, cyclohexanone and other aliphatic ketones; esters such as methyl acetate, ethyl acetate, alkyl carboxylic esters; ethers, such as methyl t-butyl ether, dibutyl ether, methyl phenyl ether and other aliphatic or alkyl aromatic ethers; glycol ethers such as ethoxy ethanol, butoxy ethanol, ethoxy 2-propanol, propoxy ethanol, butoxy 2-propanol and other glycol ethers; glycol ether esters such as butoxy ethoxy acetate, ethyl 3-ethoxy propionate and other glycol ether esters; alcohols such as methanol, ethanol, propanol, iso-propanol, butanol, iso-butanol, amyl alcohol and other aliphatic alcohols; aromatic hydrocarbons such as toluene, xylene, and other aromatics or mixtures of aromatic solvents; aliphatic hydrocarbons such as VM&P naphtha and mineral spirits, and other aliphatics or mixtures of aliphatics; nitro alkanes such as 2-nitropropane. A review of the structural relationships important to the choice of solvent or solvent blend is given by Dileep et al., *Ind. Eng. Che.* (Product Research and Development) 24, 162, 1985 and Francis, A. W., *J. Phys. Chem.*, 58, 1099, (1954).

Of course, there are solvents which can function both as coupling solvents as well as active solvents and the one solvent may be used to accomplish both purposes. Such solvents include, for example, butoxy ethanol, propoxy ethanol and propoxy 2-propanol. Glycol ethers are particularly preferred.

Suitable additives that are conventionally present in coating materials that are intended for spray application may also be present: such as, curing agents, plasticizers, surfactants, and the like.

The liquid mixture of polymers (a), a solvent component containing at least one supercritical fluid (b), and, optionally, an active solvent (c), is sprayed onto a substrate to form a liquid coating thereon by passing the liquid mixture under pressure through an orifice into the environment of the substrate to form a liquid spray.

Coating formulations are commonly applied to a substrate by passing the coating formulation under pressure through an orifice into air in order to form a liquid spray, which impacts the substrate and forms a liquid coating. In the coatings industry, three types of orifice sprays are commonly used; namely, air spray, airless spray, and air-assisted airless spray.

Air spray uses compressed air to break up the liquid coating formulation into droplets and to propel the droplets to the substrate. The most common type of air nozzle mixes the coating formulation and high-velocity air outside of the nozzle to cause atomization. Auxiliary air streams are used to modify the shape of the spray. The coating formulation flows through the liquid orifice in the spray nozzle with relatively little pressure drop. Siphon or pressure feed, usually at pressures less than 18 psi, are used, depending upon the viscosity and quantity of coating formulation to be sprayed.

Airless spray uses a high pressure drop across the orifice to propel the coating formulation through the orifice at high velocity. Upon exiting the orifice, the high-velocity liquid breaks up into droplets and disperses into the air to form a liquid spray. Sufficient momentum remains after atomization to carry the droplets to the substrate. The spray tip is contoured to modify the shape of the liquid spray, which is usually a round or elliptical cone or a flat fan. Turbulence promoters are sometimes inserted into the spray nozzle to aid atomization. Spray pressures typically range from 700 to 5000 psi. The pressure required increases with fluid viscosity.

Air-assisted airless spray combines features of air spray and airless spray. It uses both compressed air and high pressure drop across the orifice to atomize the coating formulation and to shape the liquid spray, typically under milder conditions than each type of atomization is generated by itself.

Generally, the compressed air pressure and the air flow rate are lower than for air spray. Generally the liquid pressure drop is lower than for airless spray, but higher than for air spray. Liquid spray pressures typically range from 200 to 800 psi. The pressure required increases with fluid viscosity.

Air spray, airless spray, and air-assisted airless spray can also be used with the liquid coating formulation heated or with the air heated or with both heated. Heating reduces the viscosity of the liquid coating formulation and aids atomization.

U.S. Pat. Nos. 3,556,411; 3,647,147; 3,754,710; 4,097,000; and 4,346,849 disclose spray nozzles and tips for use in airless spray, including designs and methods of manufacture and methods of promoting turbulence in the atomizing fluid.

U.S. Pat. No. 3,659,787 discloses a spray nozzle and use of electrostatics for airless spray. U.S. Pat. Nos. 3,907,202 and 4,055,300 disclose spray nozzles and use of electrostatics for air-assisted airless spray. None of these patents uses supercritical fluids as diluents to spray coating formulations.

More information about orifice sprays such as air spray, airless spray, and air-assisted airless spray, about heated orifice sprays, and about electrostatic spraying can be obtained from the general literature of the coating industry and from technical bulletins issued by spray equipment manufacturers; such as those disclosed in the following references:

1. Martens, C. R., Editor. 1974. Technology Paints, Varnishes and Lacquers. Chapter 36. Application. Robert E. Krieger Publishing Company, Huntington, N.Y.
2. Fair, James., 1983. Sprays. Pages 466–483 in Grayson, M., Editor. Kirk-Othmer Encyclopedia of Chemical Technology. Third Edition. Volume 21. Wiley-Interscience, New York.
3. Zinc, S. C., 1979. Coating Processes. Pages 386–426 in Grayson, M., Editor. Kirk-Othmer Encyclopedia of Chemical Technology. Third Edition. Volume 6. Wiley-Interscience, New York.
4. Long, G. E., 1978 (Mar. 13). Spraying Theory and Practice. Chemical Engineering: 73–77.
5. Technical Bulletin. Air Spray Manual. TD10-2R. Binks Manufacturing Company, Franklin Park, Ill.
6. Technical Bulletin. Compressed Air Spray Gun Principles. TDIO-1RX4. Binks Manufacturing Company, Franklin Park, Ill.
7. Technical Bulletin. Airless Spray Manual. TD11-2R. Binks Manufacturing Company, Franklin Park, Ill.
8. Technical Bulletin. Airless Spraying. TD11-1R-2. Binks Manufacturing Company, Franklin Park, Ill.
9. Technical Bulletin. Electrostatic Spraying TD171R. Binks Manufacturing Company, Franklin Park, Ill.
10. Technical Bulletin. Hot Spraying. TD42-1R-2. Binks Manufacturing Company, Franklin Park, Ill.
11. Technical bulletin on air-assisted airless spray painting system. Kremlin, Incorporated, Addison, Ill.

The environment into which the coating misture is sprayed is not critical. However, the pressure therein must be less than that required to maintain the supercritical fluid component of the liquid spray mixture in the supercritical state. Preferably, the coating mixture is sprayed in air under conditions at or near atmospheric pressure. Other gas environments can also be used, such as air with reduced oxygen content or inert gases such as nitrogen, carbon dioxide, helium, argon, xenon, or a mixture. Oxygen or oxygen enriched air is not desirable, because oxygen enhances the flammability of organic components in the spray.

Generally, liquid spray droplets are produced which generally have an average diameter of one micron or greater. These liquid droplets contain a portion of the solids, a portion of the solvent, and a portion of the supercritical fluid. Preferably, these droplets have average diameters of from about 5 to 1000 microns. Small spray droplets are desirable to vent the supercritical fluid from the spray droplet before impacting the substrate. Small spray droplets also give higher quality finishes.

The apparatus and methods of the present invention may be used to apply coatings by the application of liquid spray to a variety of substrates. Examples of suitable substrates include, but are not limited to, metals, wood, glass, plastic, paper, cloth, ceramic, masonry, stone, cement, asphalt, rubber, and composite materials, and agriculturally related substrates.

Films may be applied to a substrate such that the cured films have thicknesses of from about 0.2 to about 6.0 mils.

If curing of the coating composition present upon the coated substrate is required, it may be performed by conventional means, such as allowing for evaporation of the active and/or coupling solvent, application of heat or ultraviolet light, etc.

Compressed gas may be utilized to assist formation of the liquid spray and/or to modify the shape of the liquid spray that comes from the orifice. The assist gas is typically compressed air at pressures from 5 to 80 psi, but may also be air with reduced oxygen content or inert gases such as compressed nitrogen, carbon dioxide, helium, argon, or xenon, or a mixture thereof. Compressed oxygen or oxygen enriched air is not desirable because oxygen enhances the flammability of the organic components in the spray. The assist gas is directed into the liquid spray as one or more high-velocity jets of gas, preferably arranged symmetrically on each side of the liquid spray to balance each other. The assist gas jets will preferably come from gas orifices built into the spray nozzle. The assist has may also issue from an opening in the spray nozzle that is a concentric annular ring that is around and centered on the liquid orifice, to produce a hollow-cone high-velocity jet of gas that converges on the liquid spray, but this creates a larger flow of assist gas that is not as desirable. The concentric annular ring may be divided into segments, to reduce gas flow rate, and it may be elliptical instead of circular, to shape the spray. Preferably, the flow rate and pressure of the assist has are lower than those used in air spray. The assist gas may be heated to counteract the rapid cooling effect of the supercritical fluid diluent in the spray. The preferred temperature of heated assist gas ranges from about 35° to about 90° C.

Figure 37A:
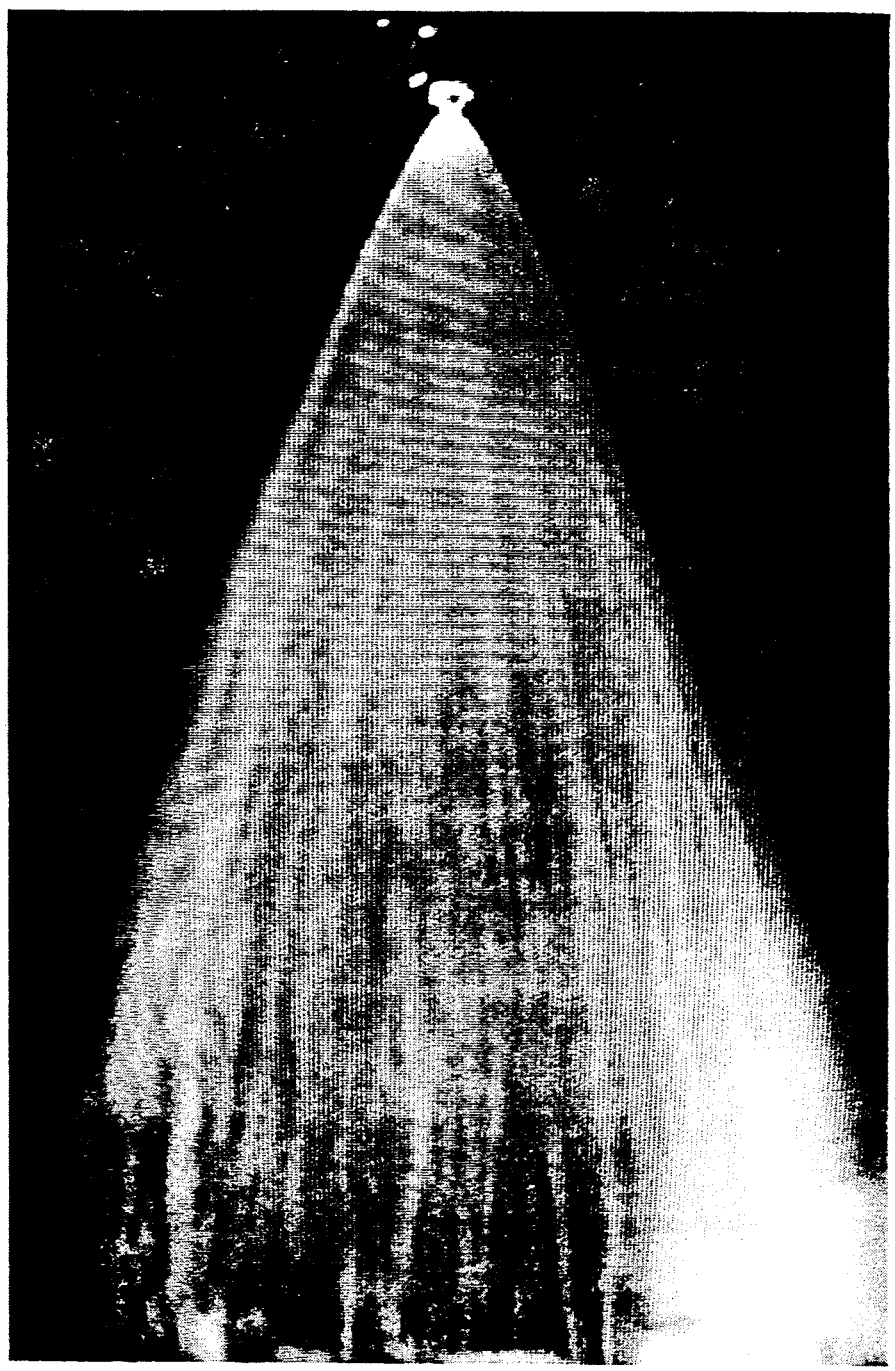
Figure 37C:
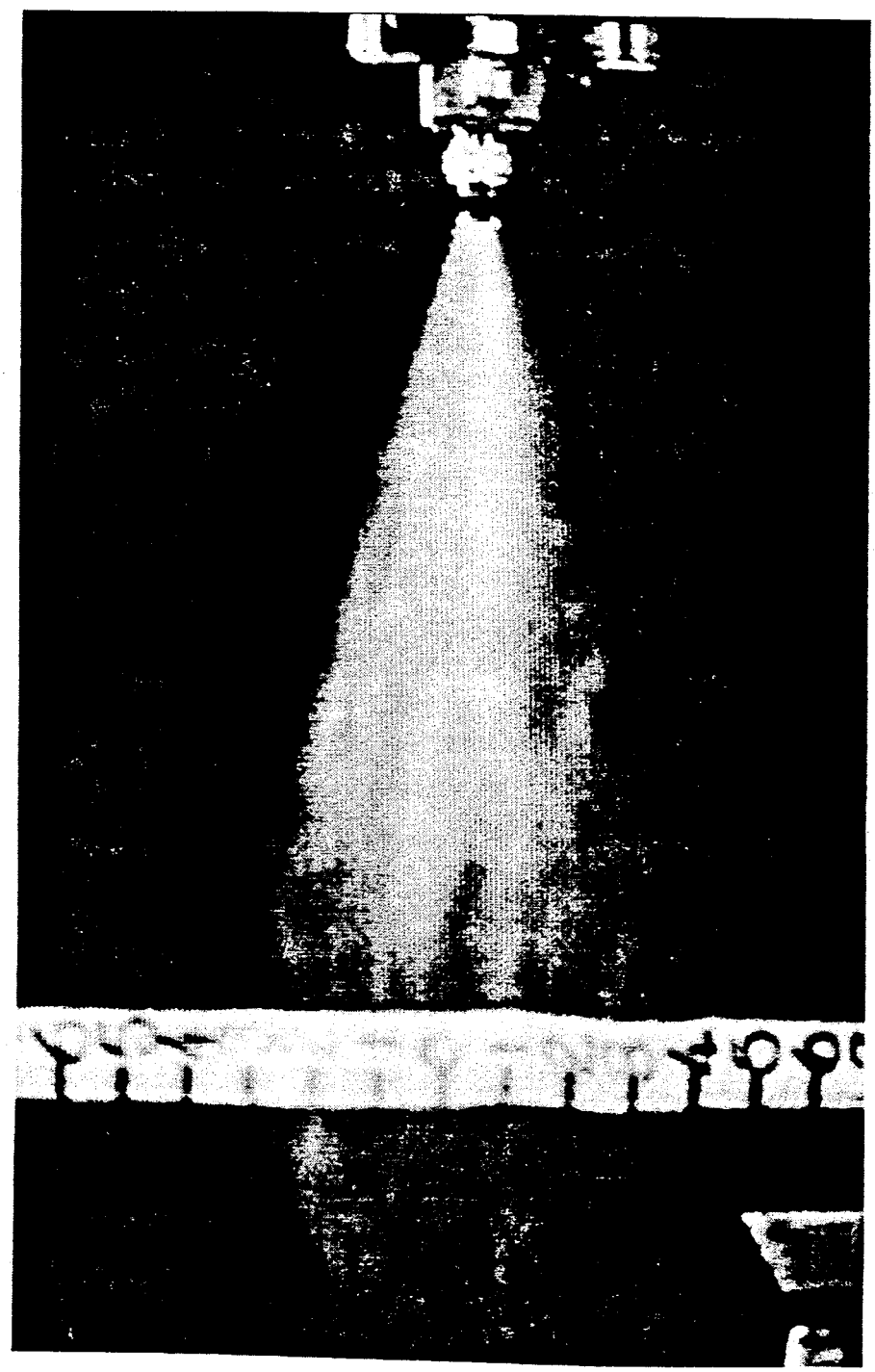
Figure 37D:
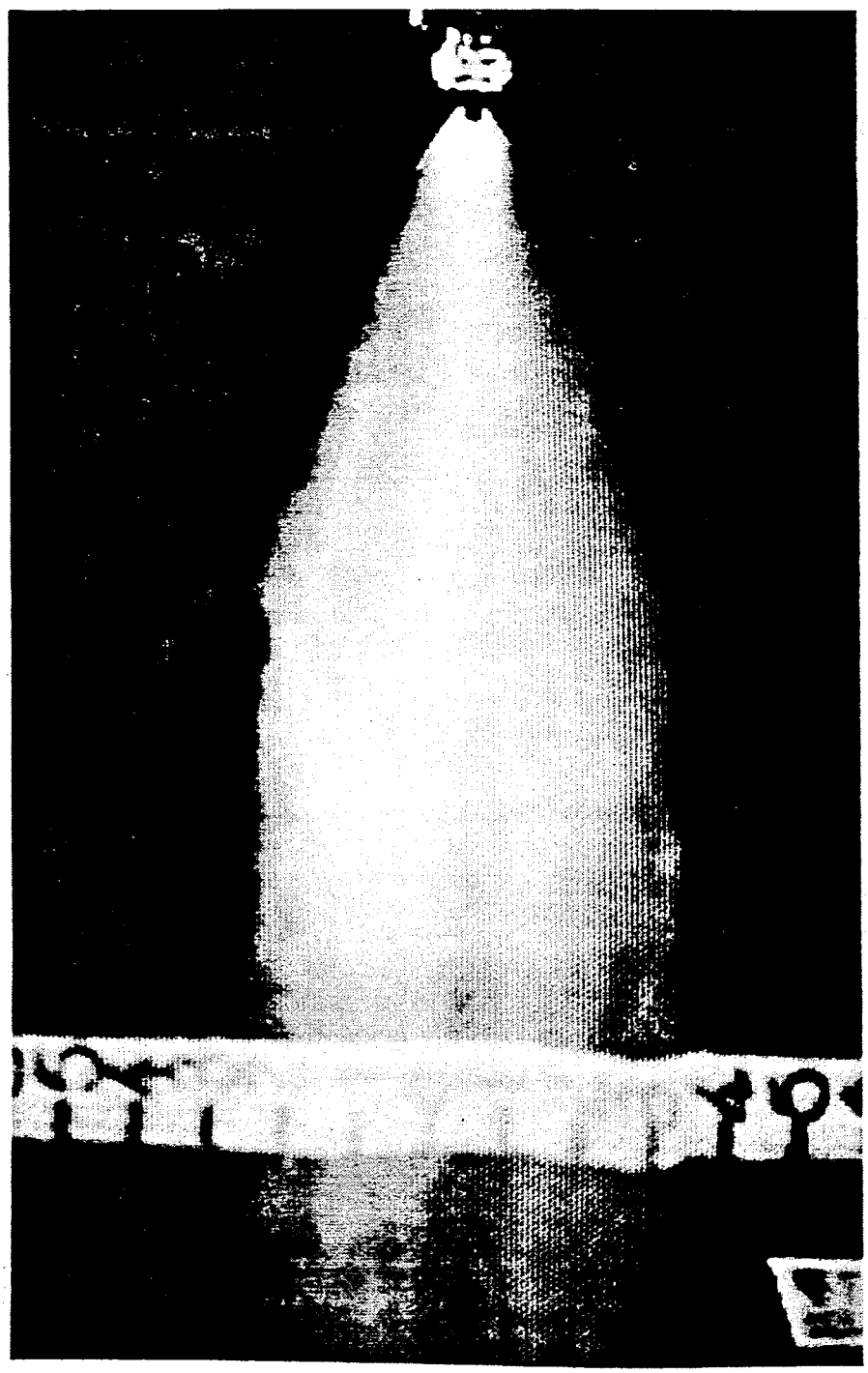

As briefly discussed earlier, one of the effects of spraying a coating mixture and the proper spray temperature so as to achieve good atomization is the appearance of a feathered spray pattern as the mixture is being sprayed. The effect of spray temperature on a sprayed coating mixture is vividly demonstrated in the photoreproductions shown in FIGS. 36 and 37. In FIG. 37, coating mixtures are sprayed containing supercritical fluids but with poor atomization caused by too low spray temperatures resulting in various types of fishtail sprays as illustrated in the Figure. FIGS. 37a and 37b show fishtail spray patterns in which the edges or margins of the spray pattern contain a higher concentration of spray material than interior portions of the spray. FIGS. 37c and 37d show fishtail spray patterns in which the edges or margins of the spray pattern have separated from the interior portion of the spray and jet out from the sides of the spray. The coherent liquid film that extends from the spray nozzle before atomization occurs can be seen, which is typical of airless atomization.

As the spray temperature is raised, the spray pattern enters a transition phase in which ultimately a feathered spray pattern, such as illustrated in FIG. 36, is obtained. FIG. 36a shows a feathered spray pattern obtained with a polyester coating formulation sprayed at a supercritical carbon dioxide concentration of 25% at a spray temperature of 60° C. and a pressure of 1600 psig. FIG. 36b shows a feathered spray pattern obtained with a cellulose acetate butyrate coating formulation sprayed at a supercritical carbon dioxide concentration of 37% at a spray temperature of 60° C. and a pressure of 1600 psig. FIG. 36c shows a closeup of a feathered spray pattern obtained with an acrylic coating formulation sprayed at a supercritical carbon dioxide concentration of 28% at a spray temperature of 50° C. and a pressure of 1600 psig. This shows the explosive atomization that occurs with the feathered spray, which causes the coherent liquid film to recede into the spray nozzle so that no liquid film is visible and atomization occurs at the spray orifice instead of away from it. FIG. 36d shows a narrower feathered spray pattern obtained with an acrylic coating formulation sprayed at a supercritical carbon dioxide concentration of 30% at a spray temperature of 60° C. and a pressure of 1600 psig. FIG. 36e shows the spray in FIG. 36d rotated ninety degrees, which shows that the spray is also feathered outwardly from the plane of the spray fan as in an air spray.

Figure 35:
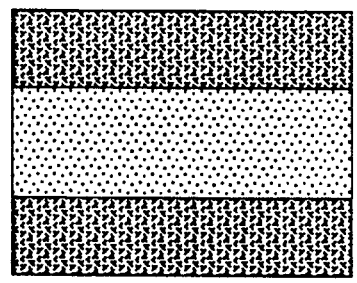
FIG. 35 is a diagrammatic illustration of a fishtail spray pattern coating layer which occurs when the spray temperature is too low and poor atomization is obtained which is not in accordance with the objectives of the present invention.
Figure 36A:
FIGS. 36a-36d are photoreproductions of actual atomized liquid sprays containing a feathered spray pattern in accordance with the objectives of the present invention.
Figure 36C:
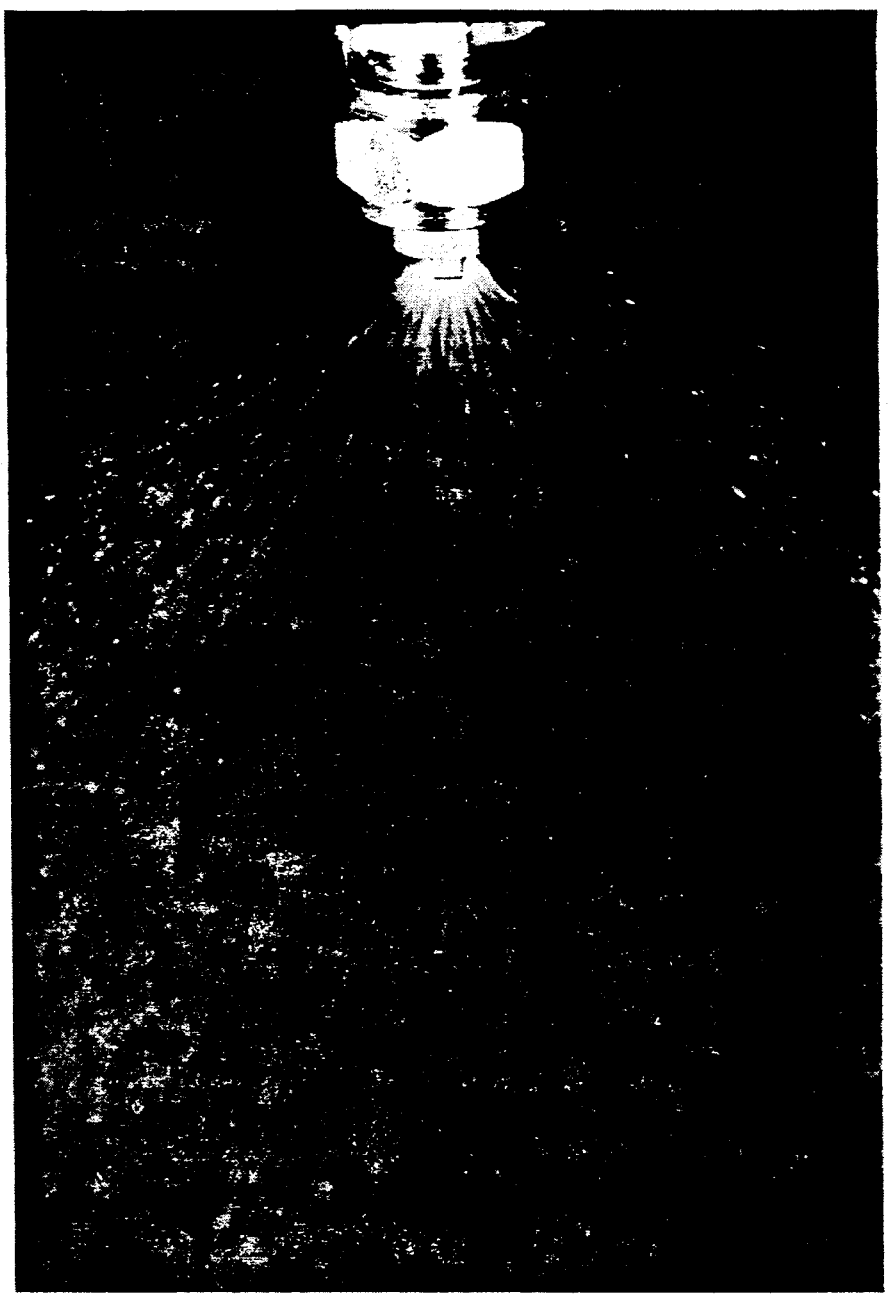
Figure 36D:
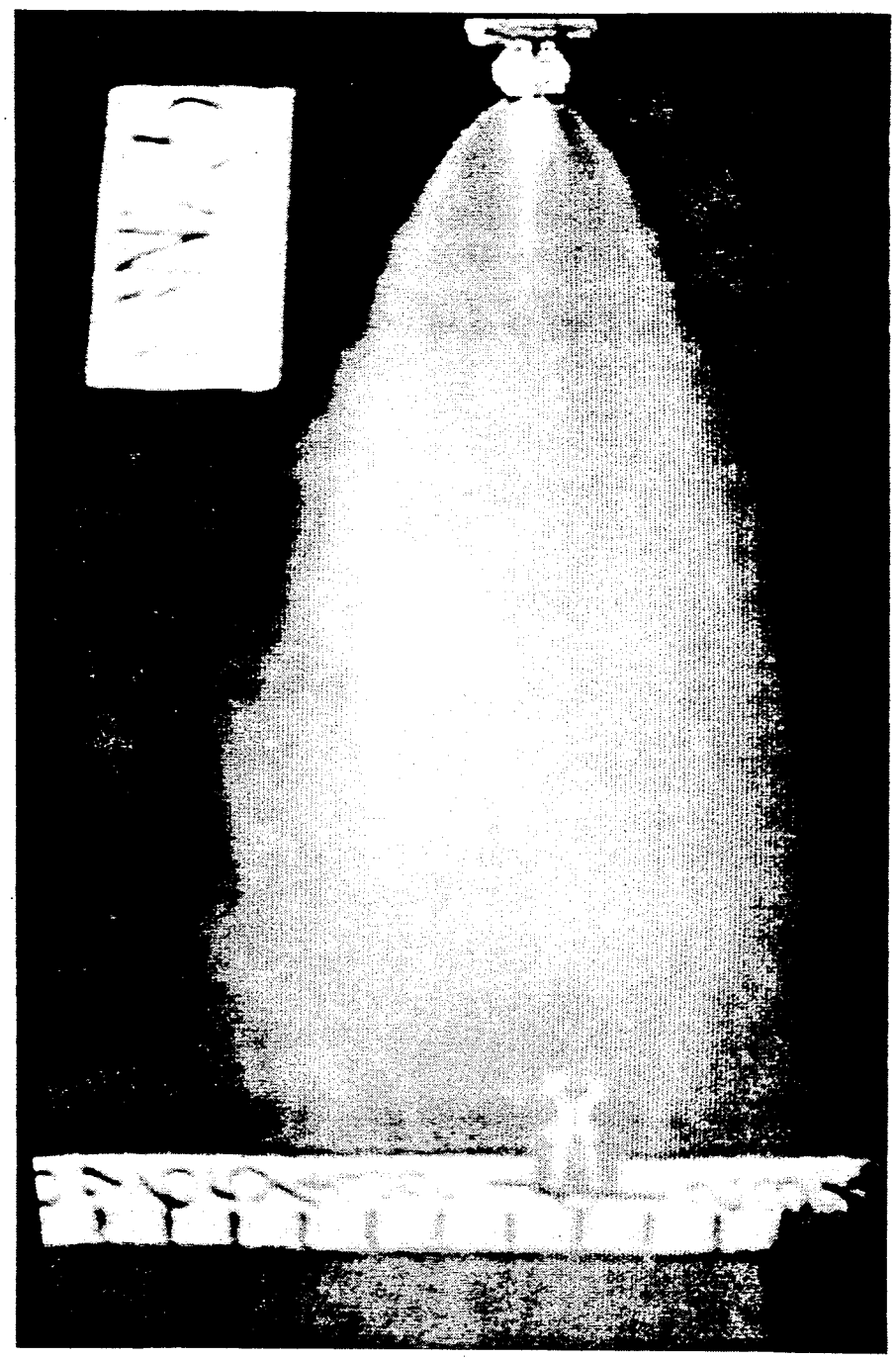
Figure 36E:
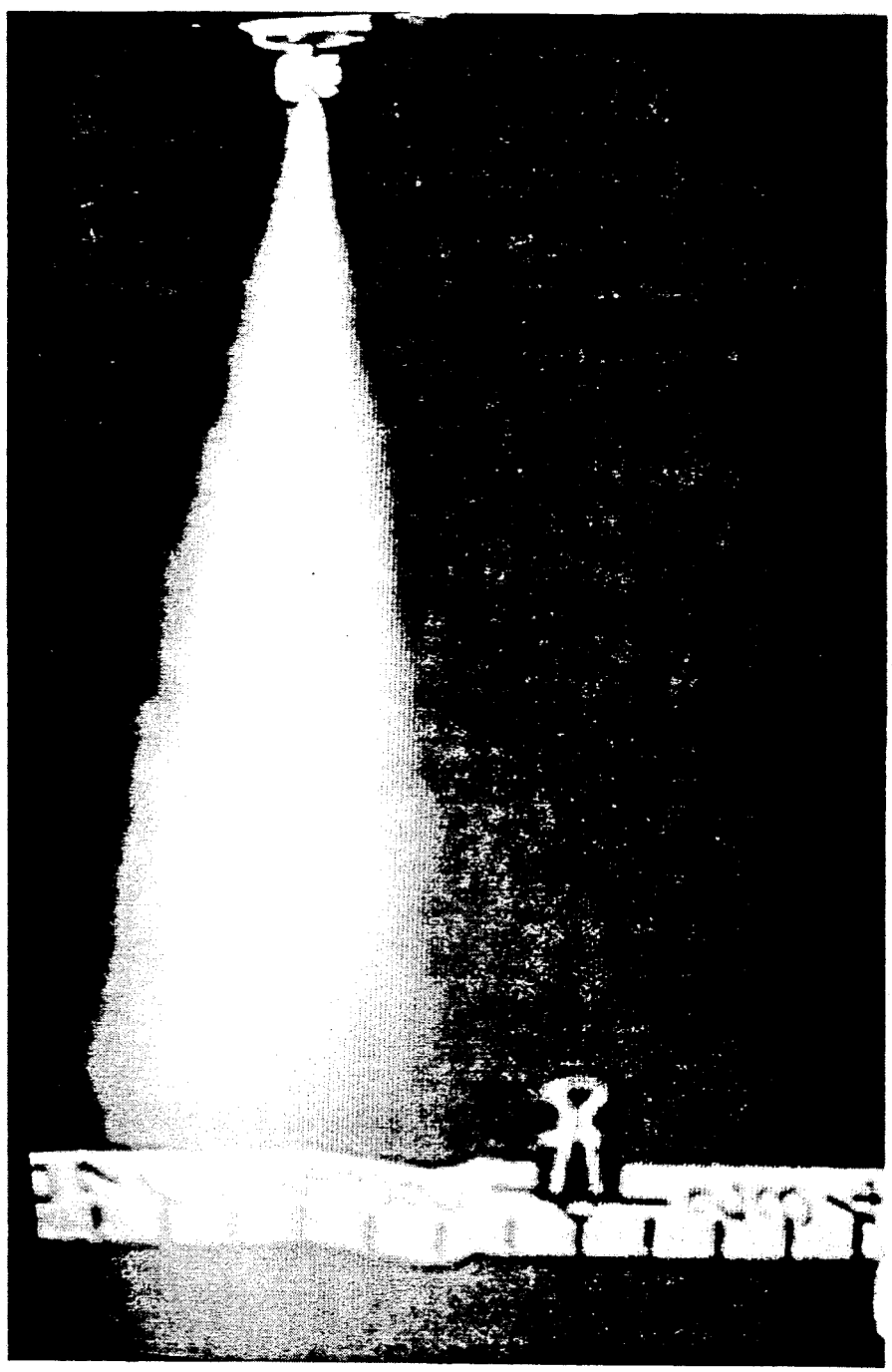

The characteristics of a coating which is obtained by spraying a fishtail pattern onto a substrate is demonstrated in FIG. 35. In FIG. 35, a diagrammatic representation of the coated particles is shown in which the edges of the spray pattern contain a higher concentration of the particles than in the center.

Figure 34:
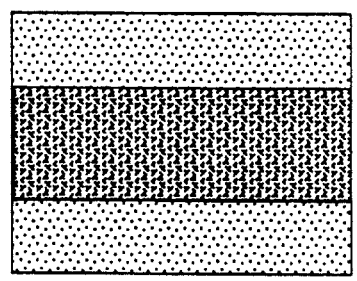
FIG. 34 is a diagrammatic illustration of a feathered spray pattern coating layer obtained on a substrate when the coating mixture is sprayed at the proper spray temperature so as to obtain good atomization in accordance with the objectives of the present invention.

In complete contrast thereto, when the coating mixture is sprayed at the proper temperature such that good atomization is obtained, a feathered spray pattern is observed on a substrate coated with such a spray which is diagrammatically illustrated in FIG. 34. FIG. 34 shows the margins of the spray pattern desirably containing less solid particles than in the center thereof, thereby permitting overlap of such coating layers to provide a uniform coating.

Accordingly, as a way to determine whether a coating mixture is being sprayed at a proper spray temperature such that good atomization is being obtained which results in a good quality coating, it is generally sufficient to simply examine the visual appearance of the spray. If a feathered spray is observed, such as those shown in FIG. 36, then it can reasonably assumed that proper atomization is being obtained and the spray temperature (for a given coating mixture containing a particular coating material, supercritical fluid, and concentration of supercritical fluid) is also properly being maintained. The presence of a fishtail pattern, however, is generally indicative of poor atomization and lower than required spray temperature.

The single-pass spraying apparatus of the present invention is shown symbolically and schematically in FIG. 1.

Preferably, all rigid connections are made with commercially available seamless, welded, type 304 stainless steel hydraulic tubing AS with 5000-psi pressure rating, using Swage fittings, or the equivalent. Flexible connections are made with commercially available high-pressure hose such as Graco static-free nylon hose model #061-221 with 3000-psi pressure rating or Graco static free nylon high-pressure hose model #061-214 with 5000-psi pressure rating. Coating material is provided by any suitable source, such as a coating material pressure tank 6 which is commercially available as Graco pressure tank model #214-833. Pressure tank 6 is connected to a commercially available pump 8, such as Graco standard double-acting primary pump with Teflon packing driven by a suitable driving means such as Graco Monark air motor 7.

Compressible material which will become the supercritical fluid, such as liquid carbon dioxide, is supplied from any suitable means such as by pressure cylinder 9. Cylinder 9 is connected to pump 11 which preferably is a double-acting pump, such as Graco model #947-963 with 4-ball design and Teflon packing driven by Graco President air motor 10 or a air driven Haskel model DSF-4 cryogenic pump. The air motors 7 and 10 are driven on demand by compressed air 1 supplied and regulated through pressure regulators 2, 3, 4, and 5.

The compressible fluid is pumped by pump 11 through a pressure regulator 35 and then preferably to a mass-flow meter 15, such as a Micro Motion Model D mass flow meter, for obtaining true mass flow measurement. The coating material is pumped by a gear pump 12 for metering the coating material flow rate. Pump 12 is connected to a precision gear meter 17, such as AW Co. ZHM-02 flow meter, for measuring the coating material flow rate. Metering pump 12 is directly controlled by the mass flow meter 15 which is connected to ratio control flow metering system 13 through remote electronics unit 14, such as a Micro Motion electronic unit. Control and data logging is completed through flow computer 18, such as AW Co. EMO-1005 flow computer, a burst mode signal conditioning unit 22, and data logger 21, such as a Molytek Recorder/Datalogger. Pressure relief valves 16 and 19 protect the pump systems from overpressurization.

From gear meter 17, the coating material is then passed to heater 20, such as a Graco or Binks high pressure fluid paint heater. The coating material, after being heated by heater 20 is then passed through a fluid filter 24, such as a Graco high-pressure fluid heater, and then through check valve 25 to mixing manifold 27.

From mass flow meter 15 the compressible fluid is passed to needle valve 23, which restricts fluid flow, then through check valve 26 and mixing manifold 27. Check valves 25 and 26 prevent cross flow.

The combined flow in manifold 27 is then passed through static mixer 28 in which the materials are mixed, such as a Kenics static mixer, and then on to single-pass spray gun 32 through heated conduit 31. Safety valve 29 protects against overpressurization. Heated fluid is supplied to both heated hose assembly 31 and single-pass airless spray gun 32 through a heating circulation loop that includes a commercially obtainable heater 33 and centrifugal circulation pump 34. Safety valve 30 provides overpressurization protection. For purposes of illustration, airless spray gun 32 and heated hose 31 are shown in simplified diagrammatic view.

In operation, the supercritical fluid, carbon dioxide for example, is fed as a liquid from cylinder 9 to the air driven liquid carbon dioxide pump 11. When the pump used is the Haskel Model DSF type of cryogenic pump referred to earlier, the one-stage single acting pump utilizes a three-way cycling spool designed for pumping liquified gases under pressure. To minimize cavitation, the cycling spool allows drive air to power the pump on the pressure stroke only. The return stroke must come from the liquified gas inlet pressure. The carbon dioxide is pumped at room temperature to a pressure greater than the operating pressure and is then regulated down by pressure regulator 35 to a steady outlet pressure that is above the critical pressure of carbon dioxide. After being pressurized by pump 11, carbon dioxide flows through the coriolis meter 15 for a true mass flow rate measurement. A fine needle valve 23 is used to control and restrict the carbon dioxide flow to the mixing manifold 27. The pressure relief valve 19 protects the carbon dioxide system from overpressurization.

The coating material is air pressurized and supplied from the pressure pot 6 by the double-acting piston pump 8 that is driven on demand by air motor 7. The coating flow rate is metered by precision gear pump 12. The speed command of pump 12 is controlled by the metering/control system 13 that receives the input signal from the Micro-motion remote electronics unit 14. The desired coating material/carbon dioxide mass ratio is, therefore, maintained when the two feeds are combined at the mixing manifold 27. The precision gear meter 17 is used for coating material flow rate measurement. The pressured coating material then flows through the high pressure heater 20, which preheats the coating material before it flows through filter 24, into the mixing manifold 27. The multi-channel flow computer 18 is used for both flow rate and totals computation/indication. The general purpose data logger 21, with mathematical capability, provides data printing and calculations functions. Pressure relief valve 16 protects the coating material system from overpressurization. Thermocouples are used to record the temperature and control heater 20 through standard process control apparatus.

The coating material and carbon dioxide are combined in the mixing manifold 27 after flowing through their respective check valves 25, 26, which are used to prevent cross-contamination of these systems. The combined flow, which is now at the proper ratio and the desired pressure and temperature, flows through static mixer 28 where the combined materials are well mixed. The mixture temperature is maintained at the desired level by the heated hose assembly 31 and the heated single-pass airless spray gun 32. Overpressurization protection is provided by relief valve 29. The temperature of the mixture is maintained while it is in the feed hose to the spray gun and in the spray gun itself by heater 33 in the loop, which contains pump 34, relief valve 30, and a thermocouple for measurement and control of the temperature of heater 33.

The single-pass airless spray gun 32, when activated, causes the whole system to operate. After start-up filling and purging of all lines and equipment, further fluid flow occurs only when the gun is activated.

As a specific example of the embodiment, pressure tank 6 is filled with a coating material containing 65.0% non-volatile polymer solids and 35.0% volatile organic solvent and is pressurized with compressed air through regulator 4 to 50 psig. The coating material primary pump 8 is primed by opening a drain valve located after filter 24. Air pressure regulator 3 is adjusted to supply air motor 7 with air at a pressure of 67 psig to pressurize the feed lines. With all valves open between the pressure tank 6 and the drain valve, flow is established draining the initial output to a waste container, and then recycling the coating material back to the pressure tank 6. Flow is continued until the temperature equilibrates at the desired spray temperature, and then the flow is stopped.

Similarly, the carbon dioxide feed line and system is vented through a vent valve located near check valve 26 to purge air from the system. Then, with the valves to the mixing point 27 remaining closed, the carbon dioxide feed line is filled to prime pump 11, with activation of pump 11 by setting regulator 5. The liquid carbon dioxide is pumped from cylinder 9, which is pressurized near its vapor pressure of about 830 psig at room temperature up to a pressure of 1800 psig which pressure is then reduced to the operating pressure of 1550 psig by pressure regulator 35.

At this point in the process, both supply systems are filled and are at their desired respective temperature and pressure. Next, the heating hose 31 and airless spray gun 32 contained within the heater circulation loop is activated by circulating the heat transfer fluid, water in this case, but other fluids can be also used, by activating pump 34. The heater 33 is controlled by temperature process control instrumentation activated by the thermocouple in the loop. When the desired temperature of 60° C. is reached, the unit is ready for spray operation.

The electronic control system consisting of elements 13, 14, 18, 21 and 22 is activated and programmed for setting and controlling the ratio of flow of the coating material to the supercritical carbon dioxide flow to the desired ratio of about 70:30. The spray gun system, between the mixing manifold valve 27 and the airless spray gun 32, is filled and purged by activating the gun 32. The initial spray will be wasted into an appropriate waste container. Finally, the preferred but not required electrostatic system (not shown) is activated by applying a high electrical voltage of 60 kilovolts to the external electrode on the spray gun. Activation of the airless spray gun 32 now causes spraying of the well mixed liquid spray mixture containing approximately 47% nonvolatile polymer solids, 25% volatile organic solvent, and 28% carbon dioxide onto the substrate positioned approximately 12 inches from the face of the spray gun. The spray pressure is 1550 psig and the spray temperature is 60° C.

The circulation of a heat transfer fluid through the single-pass airless spray gun and around the gun feed line eliminates otherwise excessive purging needed to first heat the gun and line. This purging wastes coating material and creates a waste disposal problem. In the present invention, the heated airless spray gun and spray feed hose conduit may also be used in place of or to supplement the heater used to bring the spray mixture up to desired spray temperature, instead of just maintaining the temperature. With this embodiment of the present invention, the spray gun temperature will now stay constant, regardless of whether the gun is spraying or not. Temperature fluctuation is therefore greatly eliminated.

Turning more specifically to heating hose conduit 31, it can be heated by electrical resistance heating, using thermocouples to obtain temperature control. Preferably, heating is provided by circulating hot water, or any other heat transfer fluid, such as glycol, DOWTHERM heat transfer fluid (Dow Chemical Company), mineral oils, silicon compounds, or mixtures thereof, through the airless spray gun and through overal heating hose conduit 31, i.e., around the spray feed hose, at the desired temperature. For electrostatic spraying, it is preferable that the heat transfer fluid not be electrically conductive. Using heat transfer fluid instead of electrical resistance heating is preferred because only one operating and control apparatus is needed, thereby minimizing cost and improving operation and control of the system.

FIG. 2 illustrates a cutaway view of a section of one form of heated hose conduit assembly 31, which is a preferred embodiment, that can be used to provide a means for convenying the various components in the process, including the heat transfer fluid, a supply of pressurized air, and the coating mixture to airless or air assisted single-pass spray gun 32. Specifically, in this preferred embodiment, an outer covering 36 is provided to protect the hose and other inner components from possible damage that can be caused by physical abuse. An insulation layer 37, preferable made from commercially obtainable resilient plastic or rubber or plastic foam material, serves as an insulation covering to provide temperature insulation for the components it encloses. Three liquid component hoses 38, 39 and 40—one high pressure and the other two low pressure, respectively—are contained inside insulation layer 37. For example, high pressure hose 38 preferably includes an outer covering 41, one or more braided layers 42 for protection and strength, and an inner tube 43 for conveying the coating material-carbon dioxide mixture to the spray gun 32. Additional hoses can be included such as for supplying coating and supercritical fluid separately to the spray gun or for supplying two reactive coating components separately to the spray gun. Hose 39 conveys the heat transfer fluid from heater 33 through heated hose conduit 31, to the spray gun 32. Hose 40 returns the cooled heating liquid through the heated hose conduit 31 back to heater 33. Air hose 44 delivers pressurized air to spray gun 32 when gun 32 is activated and caused to operate by air pressure. If an electrically driven gun is employed, it is obvious that air hose 44 is not needed. Thus, in an alternative embodiment of the present invention, an insulated electric cable for air hose 44 may be substituted.

Although not shown, temperature measuring insulated thermocouple lines may also be included in hose conduit 31; one or more of which could be installed to measure the temperature at one or more places within insulation layer 37 or the spray gun. Such devices provide the means for monitoring and controlling the temperature of heat transfer fluid and/or the coating mixture to allow for protection of the apparatus and the coating mixture from thermal degradation and to monitor and/or control the spray temperature at the spray gun.

In yet another embodiment of the invention (not shown), an electrostatic cable may be added as another inner component in the heated hose conduit assembly when an electrostatic airless or air assisted single-pass spray gun is utilized.

In operation, temperature control of the heat transfer fluid is accomplished through control of heater 33 using a thermocouple to measure the coating mixture temperature as well as standard temperature process control equipment. Although the absolute upper limit of the temperature in hose conduit 31 is determined by the physical characteristics of the heat transfer fluid used and the design constraints of heater 33 and pump 34 of FIG. 1, the upper temperature limit is dictated by the highest temperature at which the components of the liquid coating mixture are not significantly thermally degraded during the time that the liquid mixture is at that temperature. The lowest temperature of the heating fluid will normally be at or near the critical temperature of the supercritical fluid being used. When water is used as the heating medium and the supercritical fluid is carbon dioxide, the temperature of the water may range from about 31° C. to about 100° C.

As a result of this embodiment of the present invention in which a heated hose conduit is utilized, heat loss from the coating mixture through the feed line, before it reaches the spray gun orifice, is eliminated. In this manner, when using a single-pass spray gun apparatus, the feed hose line may be heated with an external heat source, such as the heat transfer fluid, at start-up thereby minimizing the utilization of coating mixture to do so, which wastes coating material and contributes to waste disposal problems. Moreover, the poorer quality spray coating partially produced when hose heat loss occurs is also overcome. With the circulation of low-pressure heat transfer fluid in conduits within the hose, yet another benefit is derived. The hose contains only one high-pressure conduit thereby affording maximum flexibility resulting in easy handling of the hose and gun by the spray coating operator. This is especially important in minimizing operator fatigue that could affect the quality of the coating applied to the substrate.

The material of construction of the orifice through which the admixed liquid mixture is sprayed must possess the necessary mechanical strength for the high spray pressure used, have sufficient abrasion resistance to resist wear from fluid flow, and be inert to chemicals with which it comes into contact. Any of the materials used in the construction of airless spray tips, such as boron carbide, titanium carbide, ceramic, stainless steel or brass, is suitable, with tungsten carbide generally being preferred.

The orifice sizes suitable for spraying the coating mixture should generally range from about 0.004-inch to about 0.072-inch diameter. Because the orifices are generally not circular, the diameters referred to are equivalent to a circular diameter. The proper selection is determined by the orifice size that will supply the desired amount of liquid coating and accomplish proper atomization for the coating. Generally, smaller orifices are desired at lower viscosity and larger orifices are desired at higher viscosity. Smaller orifices give finer atomization but lower output. Larger orifices give higher output but poorer atomization. Finer atomization is preferred. Therefore, small orifice sizes from about 0.004-inch to about 0.025-inch diameter are preferred.

The designs of the spray tip that contains the spray orifice and of the spray nozzle that contains the spray tip are not critical. The spray tips and spray nozzles should have no protuberances near the orifice that would interfere with the spray.

The shape of the spray is also not critical to being able to spray the coating mixture. The spray may be in the shape of a cone that is circular or elliptical in cross section or the spray may be in the shape of a flat fan, but the spray is not limited to these shapes. Sprays that are flat fans or cones that are elliptical in cross section are preferred. The distance from the orifice to the substrate is generally at a distance of from about 4 inches to about 24 inches.

Devices and flow designs that promote turbulent or agitated flow in the coating mixture prior to passing the coating mixture under pressure through the orifice may also be used. Such techniques include but are not limited to, the use of pre-orifices, diffusers, turbulence plates, restrictors, flow splitters/combiners, flow impingers, screens, baffles, vanes, and other inserts, devices, and flow networks that are used in electrostatic airless spray and air-assisted airless spray.

Filtering the coating mixture prior to flow through the orifice is desirable in order to remove particulates that might plug the orifice. This can be done using conventional high-pressure paint filters. A filter may also be inserted at or in the gun and a tip screen may be inserted at the spray tip to prevent orifice plugging. The size of the flow passages in the filter should be smaller than the size of the orifice, preferably significantly smaller.

Electrostatic forces may be used to increase the proportion of coating material that is deposited onto a substrate from the spray. This is commonly referred to as increasing the transfer efficiency. This is done by using a high electrical voltage relative to the substrate to impart an electrical charge to the spray. This creates an electrical force of attraction between the spray droplets and the substrate which causes droplets that would otherwise miss the substrate to be deposited onto it. When the electrical force causes droplets to be deposited on the edges and backside of the substrate, this effect is commonly referred to as wrap around.

Preferably the substrate is grounded, but it may also be charged to the opposite sign as the spray. The substrate may be charged to the same sign as the spray, but at a lower voltage with respect to ground, but this is of less benefit, because this produces a weaker electrical force of attraction between the spray and the substrate than if the substrate were electrically grounded or charged to the opposite sign. Electrically grounding the substrate is the safest mode of operation. Preferably, the spray is charged negative relative to electrical ground.

The method of charging the spray is not critical provided the charging method is effective. The coating material can electrically be charged by applying high electrical voltage relative-to the substrate and electrical current: 1) within the spray gun, by direct contact with electrified walls or internal electrodes before leaving the orifice; 2) after the spray emerges from the orifice by electrical discharge from external electrodes located near the orifice and close to the spray; or 3) away from the orifice, by passing the spray through or between electrified grids or arrays if external electrodes before the spray is deposited onto the substrate.

The apparatus can be used with high electrical voltage in the range of about 30 to about 150 kilovolts. Higher electrical voltages are favored to impart higher electrical charge to the spray to enhance attraction to the substrate, but the voltage level must be safe for the type of charging and spray gun used. For safety reasons, the voltage of hand spray guns is usually restricted to less than 70 kilovolts and the equipment is designed to automatically shut off the voltage when the current exceeds a safe level. Generally, for hand spray guns, the useful range of electrical current is between 20 and 200 microamperes and optimum results are obtained with coating materials that have very low electrical conductivity, that is, very high electrical resistance. For automatic spray guns that are used remotely, higher voltages and electrical currents can be safely used than for hand spray guns. Therefore the voltage can exceed 70 kilovolts up to 150 kilovolts and the current can exceed 200 microamperes.

These methods of electrostatic charging are known to those who are skilled in the art of electrostatic spraying.

For electrostatic spraying, the substrate is preferably an electrical conductor, such as metal, but substrates that are not conductors or semiconductors may also be sprayed. Preferably, they are pretreated to create an electrically conducting surface. For instance, the substrate may be immersed in a special solution to impart conductivity to the surface.

The method of generating the high electrical voltage and electrical current is not critical. Conventional high voltage electrical power supplies can be used. The power supply should have standard safety features that prevent current or voltage surges. The electrical power supply may be built into the spray guns. Other charging methods may also be used.

As a further embodiment of the present invention, the spray gun itself is also provided with a means for preventing heat loss of the coating mixture as it passes through the gun. This embodiment, as the others disclosed in this invention, may be used alone or in combination with one or more of the other embodiments that are set forth herein. FIG. 3 illustrates one embodiment of an automatic single-pass spray gun 32 which is suitable for use in the present invention and which is provided with means to accommodate the passage of heat transfer fluid. It is understood that the scope of the present invention also includes other spray gun designs which are capable of accommodating the passage of a heat transfer fluid and that the embodiment shown in FIG. 3 is but one such design. The spray gun may be provided as being either automatically or manually operated. Spray gun 32 has an inlet fitting 68 for connecting the coating mixture spray line contained in heated hose conduit assembly 31, a heat transfer fluid inlet fitting 66, and a heat transfer fluid outlet fitting 67 for connecting the heat transfer fluid hoses contained in heated hose conduit assembly 31. An inlet (not shown) for connection to the trigger actuating air line, which is also contained in heated hose conduit assembly 31, is also provided in the gun.

The back handle assembly 70 of gun 32 may be made similar, if so desired, to any commercially available spray gun. The spray head 45, shown in cross section in FIG. 3, may be attached to handle assembly 70 by an externally threaded back portion 10 which is secured by lock nut 48. Spray head 45 is also provided with an externally threaded front portion 46 for attachment of a spray nozzle. An internally threaded nozzle retaining nut 47 is secured to the externally threaded front portion 46 which retains nozzle assembly 56. Nozzle assembly 56 in turn contains flow chamber 71 and tungsten carbide spray tip 55 which includes spray orifice 96. The flanged portion of the body of nozzle assembly 56 contacts the flanged portion of retaining nut 47 and thereby forces the body of the nozzle to mate tightly against the end of spray head 45 which provides a fluid seal when retaining nut 47 is tightly screwed onto the threaded front portion 46 of spray head 45. If desired, a gasket (not shown) may be inserted between the body of nozzle 56 and spray head 45 to provide a fluid seal, but a direct metal-to-metal seal shown in FIG. 3 is preferred. The tungsten carbide spray tip 55 is press-fitted into the body of nozzle 56 in alignment with valve channel 95 in spray head 45. Spray tip 55 may be bonded to nozzle 56 with an appropriate sealant to provide a fluid seal. When under spray pressure, spray tip 55 is retained in nozzle 56 by the flanged portion that contacts the body of the nozzle. Spray tip 55 may be provided at its outer end with a substantially v-shaped notch (not shown) across orifice 96 for shaping the spray into a flat fan. It is to be understood that the present embodiment also includes other airless spray nozzle assembly, spray tip, and retaining nut designs, such as those that are commercially available, which can be attached to spray head 45 and which are well known to those skilled in the art and that the designs shown in FIG. 3 are but one embodiment of such designs. Turbulance promoters, inserts, and other devices and features, such as air assist which are commonly used with airless spray nozzles, may also be included.

Spray head body 45 is provided with an elongated cylindrical inner chamber fluid passageway 49 having a large back end portion 50 to provide for packing 51 and packing screw 52 and an internally threaded front end portion 53 for receiving threaded valve seat 54. Within chamber 49 is needle 72 with attached ball valve 73, which fits into bored valve seat 54. The outer part of spray head body 45 is milled to provide a back portion wide shoulder 57 and a front portion wide shoulder 58 and a recessed surface 59 thereby creating an annular elongated heat transfer fluid passage 60 when enclosed by sleeve 62. Wide shoulder 57 is bored providing a passageway 63 for allowing the coating mixture fluid to enter inner chamber 49. Heat transfer fluid passageway 60 is partitioned by baffles 61 and 61'. Fluid passageway 60 is enclosed by providing an outer sleeve 62 which is welded to the outer ends of shoulders 57 and 58. Sleeve 62 is bored to provide heat transfer fluid passageways 64 and 65 for allowing the heat transfer fluid to enter and leave fluid passageway 60. Fittings 66 and 67, for attaching the heat transfer fluid hoses contained in heated hose conduit 31, are also welded to sleeve 62. Likewise, fitting 68 for attaching coating mixture fluid hose contained in heated hose conduit assembly 31 is welded to sleeve 62. Sleeve 62 and front shoulder 58 are bored to desirably provide thermowell chamber 69 which is used to contain a thermocouple for measuring the temperature of the front end of the spray gun 32 Alternatively, a thermocouple (not shown) may be inserted thorugh sleeve 62 into the heat transfer fluid passage 60 to measure the temperature of the heat transfer fluid in the spray gun.

It will be appreciated that fluid passageway 60 is functionally a heat exchanger which is divided into several sections by baffles 61 and 61' forming a plurality of channels which provide a tortuous path which serves to cause turbulence and thereby enhance heat transfer by convection and conduction between the heat transfer fluid in passageway 60 and the coating mixture in chamber 49.

Figure 4:
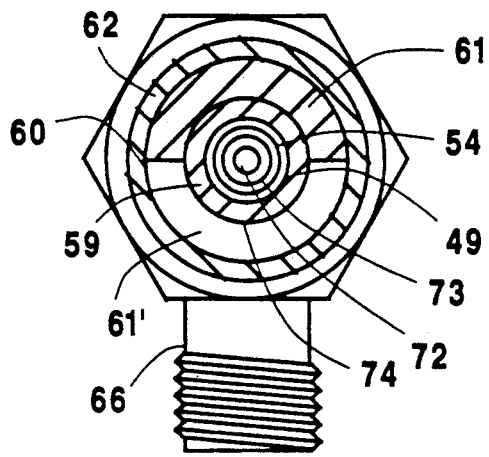
FIG. 4 is an end view of the spray gun shown in FIG. 3 taken along line 4—4 of FIG. 3.

FIG. 4, in which the same reference numerals are used to identify like elements, illustrates, in cross-section, one of the upper baffles 61 positioned around the periphery of recessed surface 59. The face of lower baffle 61' is shown positioned and spot welded at 74 beyond shown upper baffle 61 in elongated cylindrical inner chamber fluid passage 60. Also shown in FIG. 4 is outer sleeve 62, elongated fluid passage 60, part of the front face of valve seat 54, needle 72 with attached ball valve 73, and heated fluid hose connection fitting 66.

In operation, the spray gun is actuated by means of introducing compressed air via the air line to cause an internal piston to retract, thereby unseating needle valve 73 from valve seat 54. If an electrically actuated gun is used, an electric coil is energized causing the internal piston to retract. This permits the heated coating mixture to pass through passageway 49 and to be in indirect contact with the internal heat exchanger apparatus in body 45 and then to pass through valve channel 95 to chamber 71 in nozzle assembly 56 to be then ejected through spray orifice 96 in spray tip 55 as a feathered spray.

Heat from the heat transfer fluid is thereby transferred by convection to surface 59, through surface 59 by conduction, and then to the coating mixture in passageway 49 by convection thereby desirably eliminating the adverse heat loss occurring in conventional single-pass spray guns. Prevention of such heat loss by virtue of this embodiment of the present invention eliminates the waste of coating material and its waste disposal problem resulting from having to purge coating material through the spray gun until it reaches the required spray temperature for producing good quality coatings.

Figure 6:
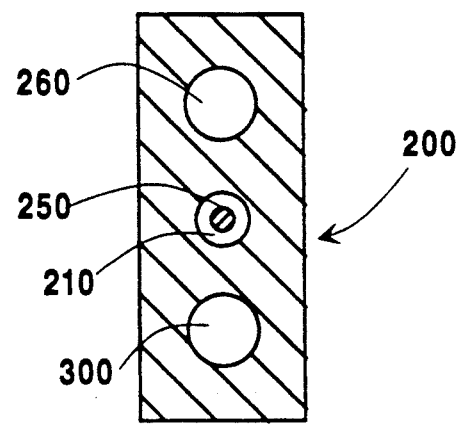
FIG. 6 is an end view of the spray gun shown in FIG. 5 taken along line 330—330 in FIG. 5.

FIGS. 5, 6, and 7 illustrate one embodiment of a single-pass electrostatic spray gun which is suitable for use in the present invention which is provided with means for internal heating to prevent heat loss of the coating mixture. FIG. 5 shows an electrically insulating plastic extension or spray head body 200 of the electrostatic spray gun. This attaches at the inlet end 320, along face 310, to a metal body or back handle assembly of the spray gun (not shown), which contains the coating inlet connection and the actuator for the spray valve, which has a connection to the air line that controls an automatic spray gun or has the manual trigger that controls a hand spray gun, which are well known to those skilled in the art. Spray head body 200 is analogous to spray head body 45 shown in FIG. 3 for a non-electrostatic spray gun. The metal body or back handle assembly may also be made similar, if desired, to any commercially available spray gun. The spray head 200 may be attached by means such as bolts or a retainer ring which are well known to those skilled in the art and which, for simplicity, are not shown in FIG. 5.

Spray head body 200 is provided with an elongated cylindrical inner chamber fluid passageway 210 that extends from the inlet end 320 to the valve seat 240 at the other end. The inlet to passageway 210 at inlet end 320 is sealed to the metal body or back handle assembly by using a suitable gasket that fits against inlet end 320 to provide a fluid seal at high pressure. Inlet end 320 may be extended outwardly from face 310 as shown for better sealing or it may be flush with face 310.

Within fluid passageway 210 is a valve stem or valve needle 250 which extends back into a valve actuator located in the metal body or back handle assembly (not shown), which construction is known to those skilled in the art. The valve needle extends along the length of the passageway 210 and is attached to ball valve 230 which is juxtaposed and seated in valve seat 240. The valve ball and valve seat are made of durable material, preferably tungsten carbide. When the valve ball is retracted from the valve seat by the valve actuator, the coating mixture flows through passageway 220 to the electrostatic spray nozzle (not shown) that contains the spray tip that is attached to face 290 by a nozzle retaining nut (not shown) that is screwed onto the end of spray head 200 using external threads 280. Preferably, passageway 220 is made with minimal diameter and length to provide clean valving of the spray.

Spray body 200 is also provided with elongated cylindrical cavity 260 for insertion of a conventional electrostatic cable assembly (not shown) which is well known to those skilled in the art for providing electrostatic charge to the spray tip. Channel 270 is provided for the insertion of a conventional tip resistor (not shown) which is well known to those skilled in the art that connects the electrostatic cable with the electrostatic electrode of the electrostatic spray nozzle.

Elongated cylindrical cavity 300 is provided for the insertion of a heating element that extends along the length of the spray body to provide heating to prevent heat loss from the coating mixture in passageway 210. FIG. 6 shows a cross-sectional view of the spray body along line 330—330. The heating element may be any suitable heating means that can be controlled to obtain the desired temperature and which is safe for use in a spray booth environment. The heating element is inserted into cavity 300 through a suitable channel provided for in the metal body or back handle assembly in a manner similar as is conventionally done to insert an electrostatic cable assembly into cavity 260. The heating element may be an electrical resistance heating element with a built-in thermocouple for controlling the heating temperature. Preferably, the heating element is heated with circulating heat transfer fluid.

One such heating element assembly 340 is shown in FIG. 7, which utilizes a concentric tubing arrangement. This heating element assembly has a benefit in that no heat transfer fluid seals need to be made with the plastic spray body or the metal body. It is understood that the scope of the present invention also includes other heating element designs which are capable of accommodate the passage of heat transfer fluid.

The heating element assembly has an outer tube 350 which can be inserted into cavity 300 along its length and be flush with the wall of cavity 300 for good conductive heat transfer. The outer tube 350 contains a concentrically positioned smaller diameter tube 360 that forms an annular region 380 for the passage of heat transfer fluid. Inner tube 360 is anchored at the far end of outer tube 350 by plug 390 that holds tube 360 in the center of tube 350. Inner tube 360 has holes or passages 400 in its wall at its far end so that heat transfer fluid can flow from the inside to the outside of tube 360. Circulating heat transfer fluid is fed into inner tube 360 and leaves from outer tube 350 through a manifold assembly 410 that also holds and positions tube 360 in the center of tube 350. Inner tube 360 extends through manifold 410 and has threads 460 (or other suitable means) for connection to the inlet heat transfer fluid conduit. Outer tube 350 terminates within manifold 410 where a fluid tight seal is provided. Heat transfer fluid flows out from tube 350 into channel 420 bored into the manifold and closed off with plug 430. From channel 420, heat transfer fluid flows into outlet tube 440 that is inserted into the manifold where a fluid tight seal is also provided. Outlet tube 440 similarly contains threads 450 (or other suitable means) for connection to the outlet heat transfer fluid conduit.

Figure 8:
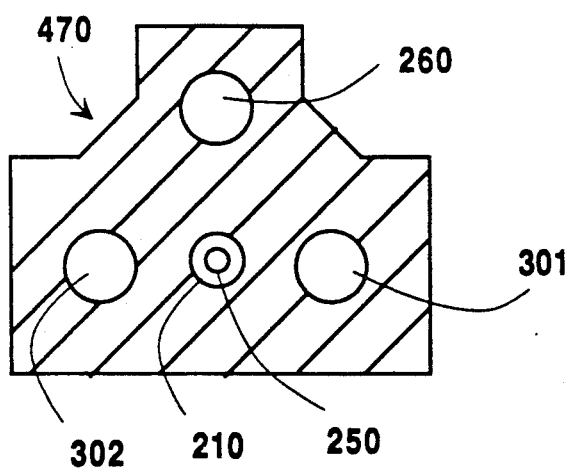
FIG. 8 is an end view of a variation of the spray gun shown in FIGS. 5 and 6 that uses two heating elements such as shown in FIG. 7.

For simplicity, FIG. 5 shows a single cavity 300 for insertion of a heating element. FIG. 8 shown in cross-sectional view that a spray gun body 470 can also be fabricated having two cavities 301 and 302 for insertion of two heating elements on opposite sides of passageway 210 to provide more uniform heating, if so desired. The heating elements may be smaller or greater in diameter than those shown in the Figures. The heating element should preferably extend the full length of cavity 300 and may be made of flexible tubing. Preferably, the tubes 350, 360 and end plug 390 are constructed from electrically insulating materials such as the plastics used for the spray body and the electrostatic cable. The manifold 410 may be made as a integral part of the metal body or back handle assembly, if desired.

FIGS. 9 to 14, in which the same reference numerals have been used to designate similar elements, illustrate another single-pass electrostatic spray gun design which is suitable for use in the present invention and which is provided with means for internal heating to prevent heat loss from the coating mixture. This design passes heat transfer fluid directly through the spray head of the spray gun instead of through a heating element and can achieve more uniform heating. FIGS. 9 and 10 show the electrically insulating plastic extension or spray head body 500 of the electrostatic spray gun viewed in cross-section from the side and bottom, respectively. FIGS. 11 to 14 show cross-sectional end views of spray head 500 along lines 511, 512, 513, and 514, respectively. Spray head 500 attaches along face 310, to the metal body or back handle assembly of the spray gun (not shown) as described in the previous design of FIGS. 5 to 7. The electrostatic spray nozzle (not shown) that contains the spray tip is similarly attached to face 290 by a nozzle retaining nut (not shown) that is screwed onto the end of spray head 500 using external screw threads 280.

Spray head body 500 is provided with an elongated cylindrical inner chamber fluid passageway 210 that extends from the inlet end 320 to the valve seat 240 at the other end. The inlet to passageway 210 at inlet end 320 is sealed to the metal body or back handle assembly by using a suitable gasket that fits against inlet end 320 to provide a fluid seal at high pressure. Inlet end 320 may extend outward from face 310 as shown for better sealing or it may be flush with face 310.

Within fluid passageway 210 is a valve stem or valve needle 250, which extends back into a valve actuator located in the metal body or back handle assembly and which construction is known to those skilled in the art. The valve needle extends along the length of passageway 210 and is attached to ball valve 230 which is juxtaposed with and seated in valve seat 240. The valve ball and valve seat are made of durable material, preferably tungsten carbide. When the valve ball is retracted from the valve seat by the valve actuator, the coating mixture flows through passageway 220 to the attached spray nozzle (not shown). Preferably, passageway 220 is made with minimal diameter and length to provide clean valving of the spray.

Spray body 500 is provided with elongated cylindrical cavity 260 for insertion of a conventional electrostatic cable assembly (not shown) which is well known to those skilled in the art for providing electrostatic charge to the spray nozzle. Channel 270 is provided for insertion of a conventional tip resistor (not shown) which is well known to those skilled in the art and which connects the electrostatic cable with the electrostatic electrode of the electrostatic spray nozzle.

Figure 12:
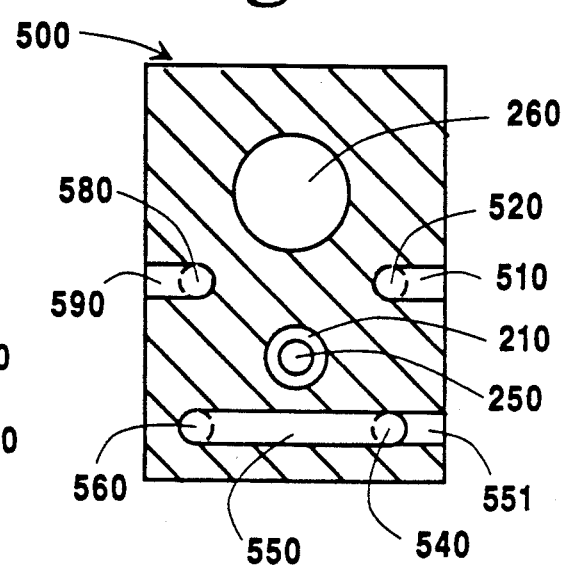
FIG. 12 is an end view of the spray gun shown in FIGS. 9 and 10 taken along line 512—512.
Figure 13:
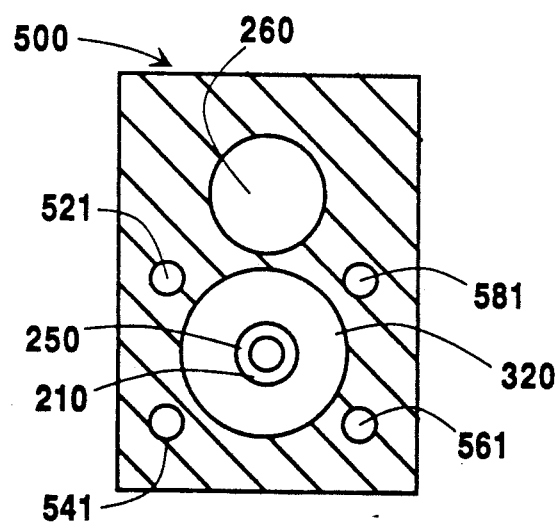
FIG. 13 is an end view of the spray gun shown in FIGS. 9 and 10 taken along line 513—513.
Figure 14:
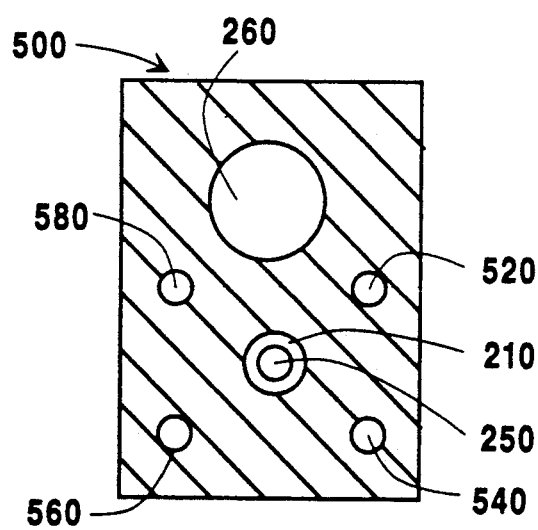
FIG. 14 is an end view of the spray gun shown in FIGS. 9 and 10 taken along line 514—514.

Spray head 500 is also provided with a channel network for circulation of heat transfer fluid through the spray head in order to provide indirect heating to prevent heat loss from the coating mixture. The heat transfer fluid enters spray head 500 through passage 510 and flows successively through interconnecting passages 520, 530, 540, 550, 560, 570, and 580, and exits through the opposite side of the spray head through passage 590. Passages 510 to 590 are formed by molding or boring the individual passages into spray head 500 from the back end (face 310) or sides or bottom so as to form an interconnecting channel network. Passages 520, 530, 540, 550, 560, 570, and 580 are sealed or plugged at their entrances to spray head 500 by electrically non-conductive plastic plugs 521, 531, 541, 551, 561, 571, and 581, respectively. As seen from FIGS. 9 to 12, the heat transfer fluid flows inwardly from entrance passage 510 to passage 520 (FIGS. 9 and 12), forward through passage 520 along the upper right portion of the spray head to passage 530 (FIGS. 9 and 11), downward through passage 530 to passage 540, backward through passage 540 along the lower right to passage 550 (FIG. 9), sideways through passage 550 to passage 560 (FIGS. 9 and 12), forward through passage 560 along the lower left to passage 570 (FIG. 10), upward through passage 570 to passage 580 (FIG. 11), backward through passage 580 (FIG. 14) to passage 590, and outward from passage 590 (FIG. 12). This channel network provides for uniform heating of the coating mixture along the length of the spray head. Vertical channels 530 and 570 provide additional heat to the vicinity of the flow valve. It is to be understood that this embodiment, as illustrated in FIGS. 9 to 14, is not limited to the heat transfer channel network shown. Any other suitable design may be used that provides for circulation of heat transfer fluid through the spray head body to provide heating of the coating mixture to prevent heat loss. Furthermore, an analogous heat transfer fluid channel network may also be incorporated into the metal body or back handle assembly to heat it in conjunction with the spray head.

The method of fabrication of the heat transfer fluid channel network in the spray head is not critical. For example, the passages may be molded into the spray head body or they may be bored or drilled into it by techniques known to those skilled in the art. The network of passages may be molded into the spray head body by 1) forming the network in solid form out of a sacrificial solid material which is placed into the spray head mold in the shape of the network desired, 2) filling the spray head mold with fluid plastic or plastic components that forms the spray head body after solidification, 3) solidifying the plastic or plastic components by curing by any of the techniques known for thermoplastic or thermosetting plastic materials by those skilled in the art, and 4) removing the sacrificial solid material that forms the desired network by melting, dissolving, or thermally, electrically, or chemically decomposing it by techniques known to those skilled in the art. The network design, plastic materials used, and technique of fabrication should give a spray head body with the requisite mechanical strength needed for safe operation of a spray gun that is spraying coating material heated at high pressure. Furthermore, the materials used should be resistant to the chemical components such as solvents used in coating mixtures and in cleaning solutions that are used to clean coating mixtures from the spray gun.

The inlet and outlet arrangement shown has a benefit in that no fluid seals for heat transfer fluid are needed between spray head 500 and the metal body or back handle assembly. Inlet passage 510 and outlet passage 590 are preferably made larger in diameter than the rest of the network channels and larger than shown for simplicity in the figures in order to facilitate insertion of connectors to the inlet and outlet heat transfer fluid conduits, respectively. Passages 510 and 590 may be threaded so that the connectors screw in or the connectors may be plastic tubing that is bonded or sealed directly to spray head 500. The connectors may have a ninety-degree bend such as to receive the heat transfer fluid conduits from direction of the back, top, or bottom of the spray gun. The connectors may also be bonded directly to the outside of spray body 500 such that passages 510 and 590 do not require a larger diameter than the rest of the network as shown in the figures. The spray body may also be constructed such that connectors are built into and extend outward from the spray body, such as shown previously in the heat transfer element in FIG. 7. It is to be understood that this embodiment, as illustrated in FIGS. 9 to 14, is not limited to the methods described of feeding heat transfer fluid to the spray body or the method used to connect the heat transfer fluid conduits to the spray body. Any other suitable design may be used.

The connectors to the heat transfer fluid conduits may also be built into or attached to the metal body or back handle assembly instead of directly to the spray body. This has an advantage that heat is supplied to the metal body or back handle assembly but it has a disadvantage that fluid seals for heat transfer fluid are needed between the spray body and the metal body or back handle assembly. For this arrangement, inlet and outlet passages 510 and 590 are not used. Passages 520 and 580 become the inlet and outlet to the heat transfer fluid channel network by omitting plugs 521 and 581. Heat transfer fluid flows to and from the spray body through passages 520 and 580, which are sealed to the metal body or back handle assembly with gaskets and mate with appropriate heat transfer channels through the metal body or back handle assembly that interconnect with the connectors to the heat transfer fluid conduits.

Figures 15, 16:
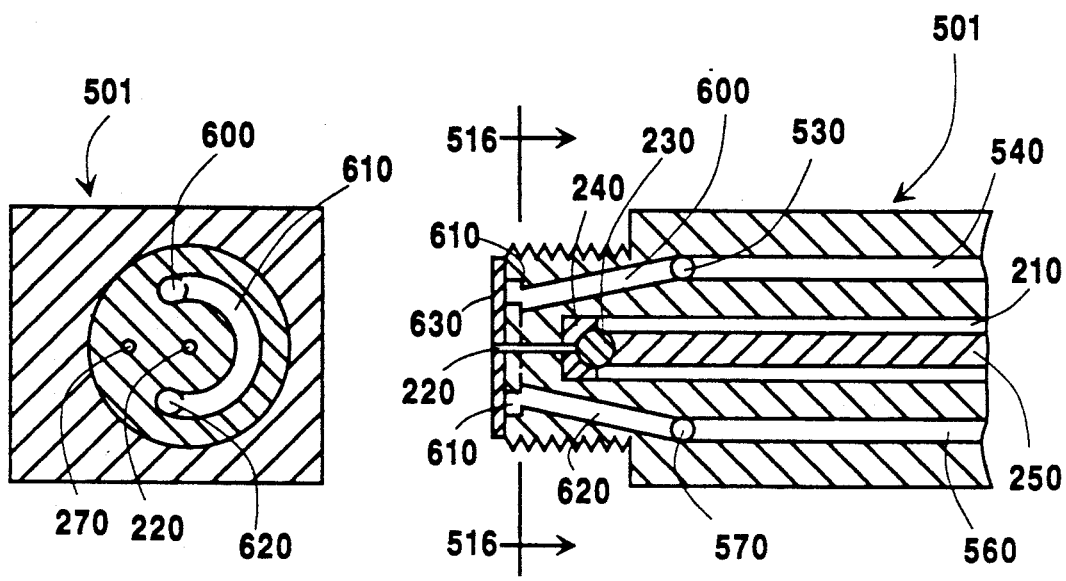
FIG. 15 is a longitudinal cross-sectional view of a variation of the spray gun shown in FIGS. 9 and 10 which has additional channels for heating the coating mixture by heat transfer fluid in the region of the valve and spray nozzle.
FIG. 16 is an end view of the spray gun shown in FIG. 15 taken along line 516—516.

FIGS. 15 and 16 show a variation of the spray gun design shown in FIGS. 9 to 14 and which has additional passages that circulate heat transfer fluid to the front of the spray head body to provide heat to the spray nozzle and valve to prevent heat loss. FIG. 15 shows the front end of spray head body 501 as viewed from the bottom such as previously shown in FIG. 10. FIG. 16 is a cross-section end view of spray head 501 along line 516. Passages 600 and 620 extend from the front face of the spray head into vertical passages 530 and 570, respectively, as shown. A semi-circular groove 610 is machined or molded into the front face of spray head body 501 and is capped with face plate 630, which is bonded to spray head 501, to form passage 610 that connects passages 600 and 620. The spray nozzle attaches to face plate 630 in the same manner as to the spray head body itself. Face plate 630 has a hole to continue passageway 220 for flow of coating mixture from the spray gun head to the spray nozzle and has a hole to continue passage 270 for the electrostatic tip resistor. Heat transfer fluid flows from passage 530 forward through passage 600 to passage 610, through passage 610 around the semi-circular path to passage 620, to heat the spray nozzle while allowing for the electrostatic connection through 270 to be made to the spray nozzle, and through passage 620 to passage 560. It is to be understood that this embodiment, as illustrated in FIGS. 15 and 16, is not limited to the heat transfer channel network shown. Any other suitable design may be used that provides for circulation of heat transfer fluid through the spray head body to heat the end of the spray head that connects to the spray nozzle.

Figure 17:
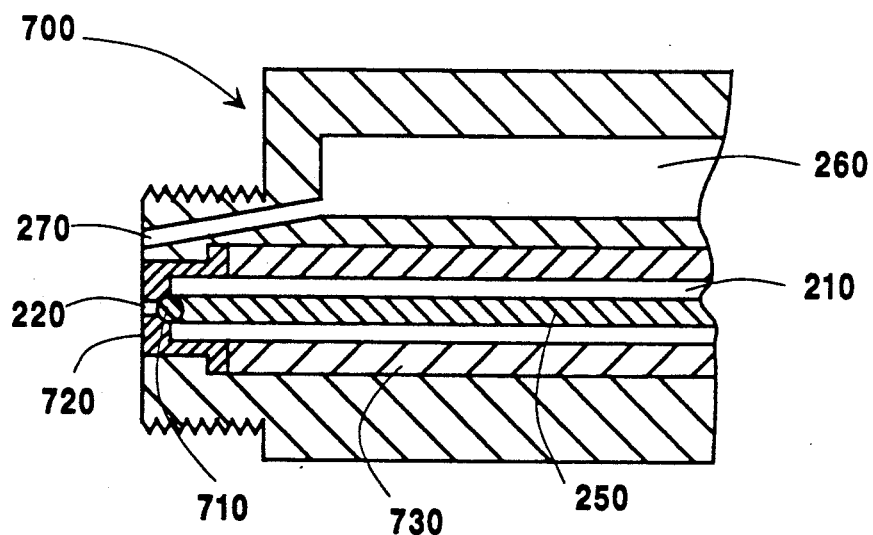
FIG. 17 is a longitudinal cross-sectional view of a variation of the spray guns shown in FIGS. 9, 10, and 15 having another valve seat design.

FIG. 17 shows a variation of the spray gun designs shown in FIGS. 9 to 16 which has a spray head body 700 with a valve seat design that minimizes the length and volume of passageway 220 to better provide cleaner valving of the spray. Valve seat 720 extends to the front face of the spray head so that the spray nozzle seats directly against it. The valve seat is anchored in the spray head by an inward extension that has a wider diameter retaining ring that seats against the spray head. Plastic tubular insert 730 is inserted behind the seat valve to form fluid passageway 210. Ball valve 710 may be smaller in diameter to minimize the diameter of valve seat 720. It is to be understood that this embodiment, as illustrated in FIG. 17, is not limited to the valve seat design shown. Any other suitable valve seat design may be used that minimizes the volume of passageway 220.

Figure 18:
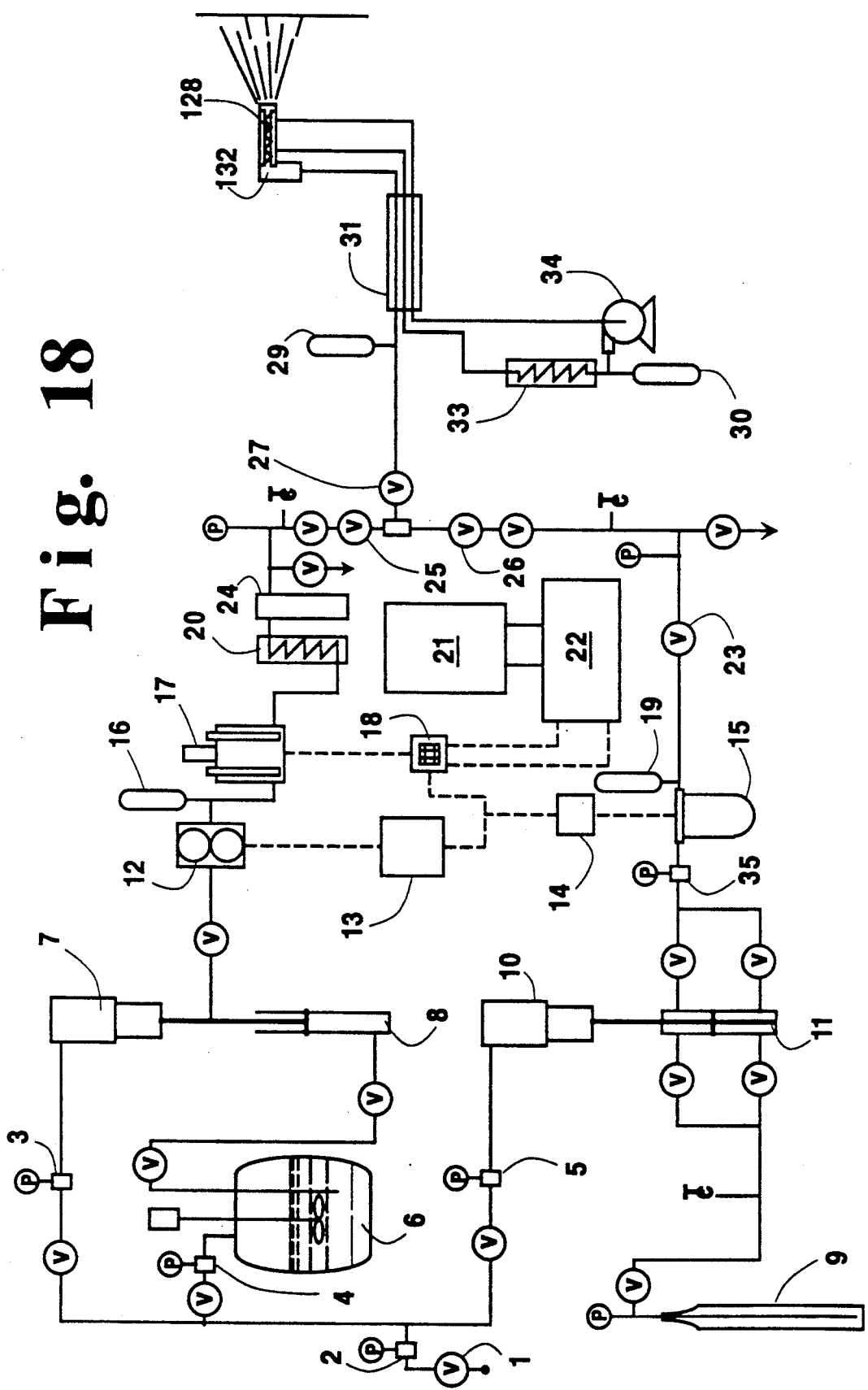
FIG. 18 is a schematic diagram of an embodiment of the present invention in which the single-pass spray gun is internally provided with a static mixer.

In yet another embodiment of the present invention, as shown in FIG. 18, the in-line static mixer 28 of FIG. 1 is eliminated and mixing is provided by incorporating a static mixer 128 in spray gun 132 whereby the coating material and supercritical fluid are mixed within the spray gun itself. If desired, an in-line static mixer may still be utilized in addition to the mixer incorporated into the gun. The use of a static mixer within the gun is particularly preferred when it is desired to delay mixing of one or more of the coating mixture constituents for as long as possible. For example, in a catalyzed reaction for forming a polymeric mixture in situ, it would be desirable to add the catalyst at the gun site for mixing with the monomers instead of adding such catalyst upstream as in, for example, the in-line mixer 28 of FIG.

1. The process shown in FIG. 18 includes the same elements as previously described in FIG. 1 except for the removal of static mixer 28.

Figure 19:
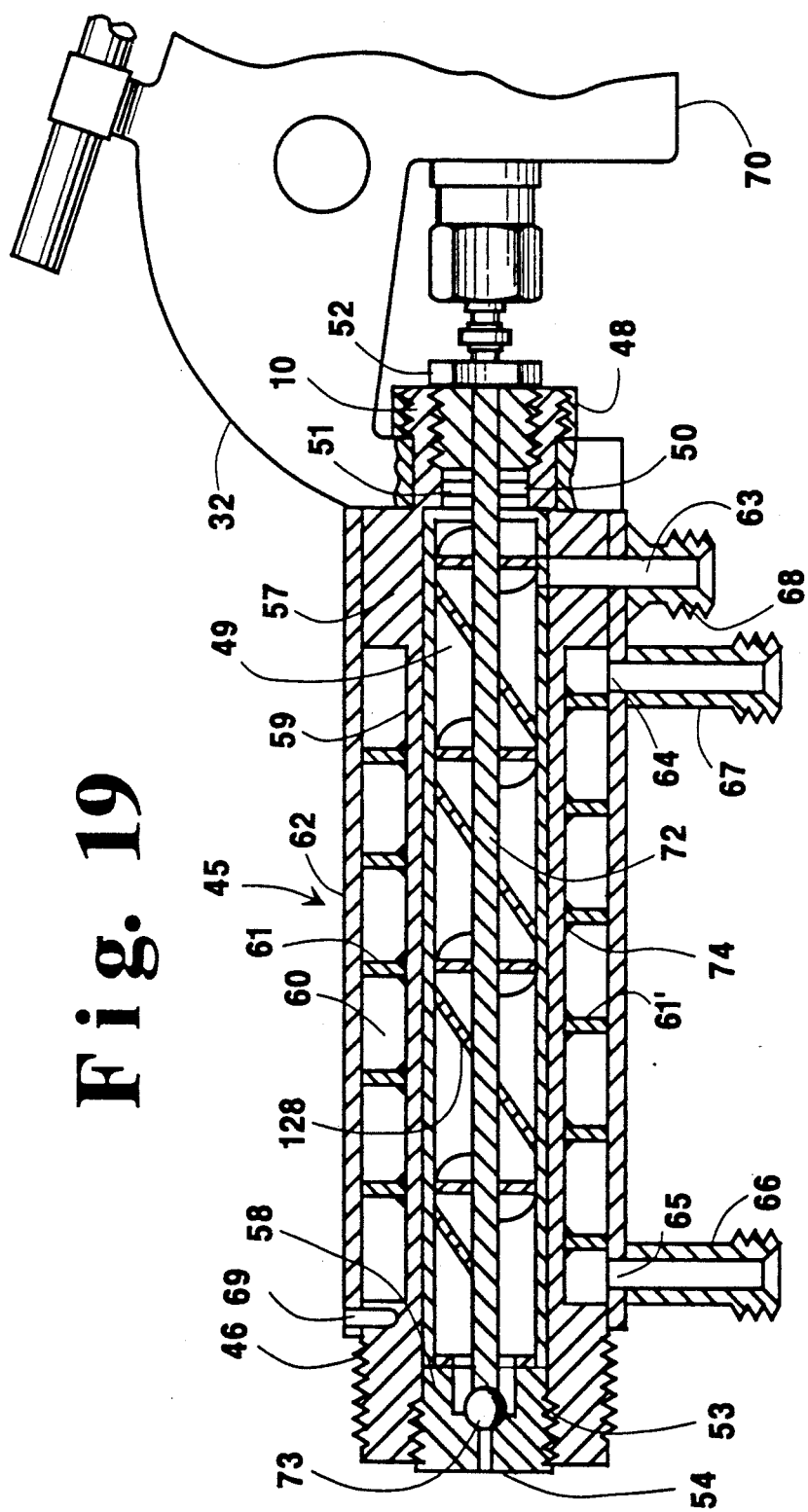
FIG. 19 is a longitudinal cross-sectional view of the single-pass spray gun with the static mixer shown symbolically in FIG. 18.

FIG. 19 illustrates an embodiment of an automatic single-pass spray gun which incorporates a static mixer within the coating mixture passageway. Other specific designs, other than then one shown, may also be utilized but it is understood that it is within the scope of the present invention to include such alternate designs.

The spray gun shown in FIG. 19 is essentially identical to that shown in FIG. 3 with the exception of the incorporation of the static mixer assembly 128 where like reference numerals are used to identify the same elements.

In particular, referring to FIG. 20, the static mixer assembly 128 may be designed in a fashion which is well known, such as that manufactured by Charles Ross & Son Co., in which the mixing elements are arranged in series and are rotated to intersect the previous element at 90°. Mixing elements 140 are rotated and joined by welding 142 at the perimeter to rods 143, which are positioned at a 90° angle from each other. Before assembly, elements 140 are bored to a tolerance which allows the longitudinal passage and unrestricted lateral movement of needle 72 while at the same time restricting flow of fluid along the needle to a minimum level. The circular solid rear end piece 144 is bored to provide a passageway for needle 72 and is also welded to rods 143. When mixer assembly 128 is positioned in gun 32, end piece 144 abuts against and forms a tight seal with back end portion 50 and packing 51. Front end piece 145 is welded to rods 143 in a likewise manner. This piece, however is not solid, but a washer-like element that provides a passageway for the coating material to flow through valve seat 54 and thence through a spray tip orifice (not shown). When assembled, front end piece 145 fits against and is held in position by valve seat element 54.

Figure 21:
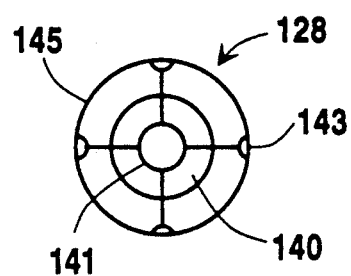
FIG. 21 is an end view of the static mixer assembly taken along line 8—8 of FIG. 20.
Figure 11:
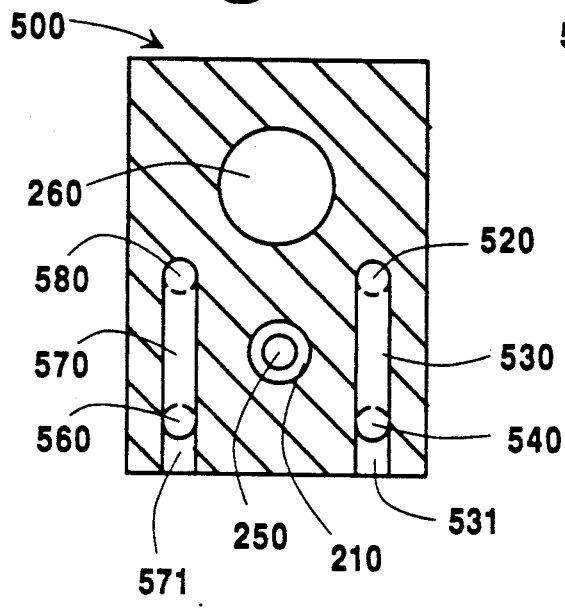
FIG. 11 is an end view of the spray gun shown in FIGS. 9 and 10 taken along line 511—511.

FIG. 21 shows an end view of assembly 128 where front end piece 145 is clearly seen. The design concept of this embodiment allows for the easy removal of the mixer assembly 128 to facilitate cleaning and repair. It is to be understood that this embodiment, as illustrated in FIGS. 19 to 21, is not limited to the static mixer as shown. Any other suitable design may be used provided a central orifice is present to allow insertion and operation of the needle and valve assembly.

Mixing is achieved in static mixer assembly 128 by the channels of flow created by the element shapes and the conduit wall being rotated 180°. Each channel is then redivided and rotated 180° in the opposite direction, meeting the leading edge of the next element in series. This action of division, rotation, and flow reversal produces striations in increasing numbers as coating mixture travels through the chamber. One advantage of this embodiment of the present invention is to supply a coating mixture more homogeneous in composition and temperature to the spray tip orifice resulting in improved atomization and spraying. So too, by exposing more surface area of the coating mixture in the spray gun as a result of the mixing action, better heat transfer is effected by the indirect heat exchange with the heat transfer fluid contained in the gun.

Figure 22:
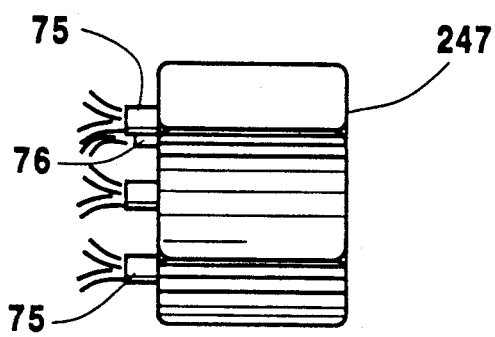
FIG. 22 is another embodiment of the present invention which shows a side elevation of a heated nozzle assembly and retaining nut.
Figure 23:
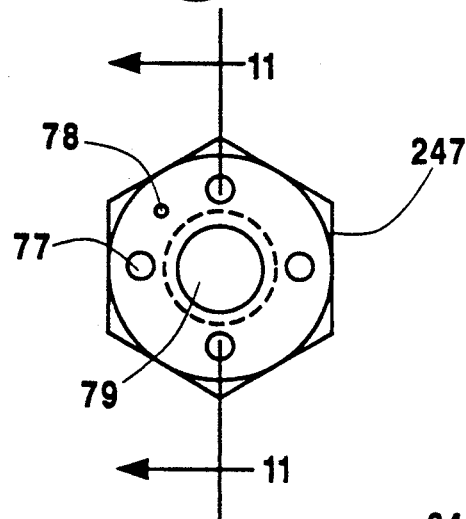
FIG. 23 is an end view of the nozzle assembly and retaining nut shown in FIG. 22.
Figure 24:
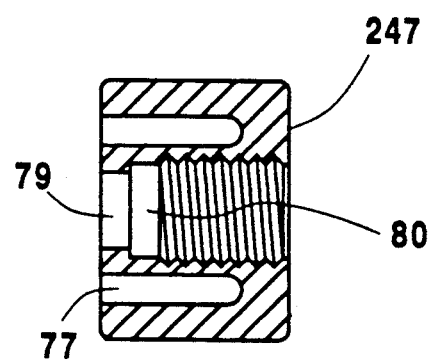
FIG. 24 is a longitudinal cross-sectional view of the assembly shown in FIG. 23 taken along line 11—11 of FIG. 23.

In still a further embodiment of the present invention, means are provided for specifically heating the spray nozzle of the spray gun to avoid the problems noted earlier. Accordingly, FIGS. 22 to 24 illustrate a modified form of threaded nozzle retaining nut that can be used with the spray guns shown in FIGS. 3 and 19. This improvement provides a means of heating nozzle assembly member 56 and spray orifice tip 55 by conduction heat transfer thereby assuring that the liquid coating mixture is being sprayed at the desired temperature. In all other respects, the embodiments shown in FIGS. 3 and 19 remain the same. FIG. 22 illustrates improved threaded nozzle retaining nut 247 with cartridge heaters 75 and thermocouple 76 shown inserted in wells bored in 247. The cartridge heaters may be any readily obtainable commercial electrical resistance heaters, such as Watlow AB FIREROD high density cartridge heater. Thermocouple 76 may be any commercially available thermocouple in the desired type of junction and conductors.

The heater 75, shown in FIG. 22, has three wires emerging from the end of the cartridge; two of which are electrical conductors carrying current to and from the heater, the other represents a two-wire thermocouple. These wires are connected to a process control system, not shown, used to control the nozzle assembly at a desired temperature.

FIG. 24 illustrates a view taken along line 11—11 of FIG. 23 where front cavity 79 is made by boring to exact dimensions to receive the front of the spray nozzle. Threaded rear cavity 80 is made by boring to exact dimensions to receive the spray nozzle and threaded to fit threaded front portion 46 on front shoulder 58 of spray gun head 45 of FIG. 3.

Figure 27:
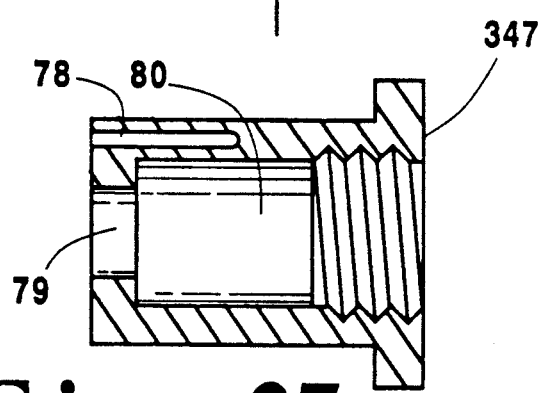
FIG. 27 is a longitudinal cross-sectional view of the assembly shown in FIG. 26 taken along 14—14 of FIG. 26.
Figure 25:
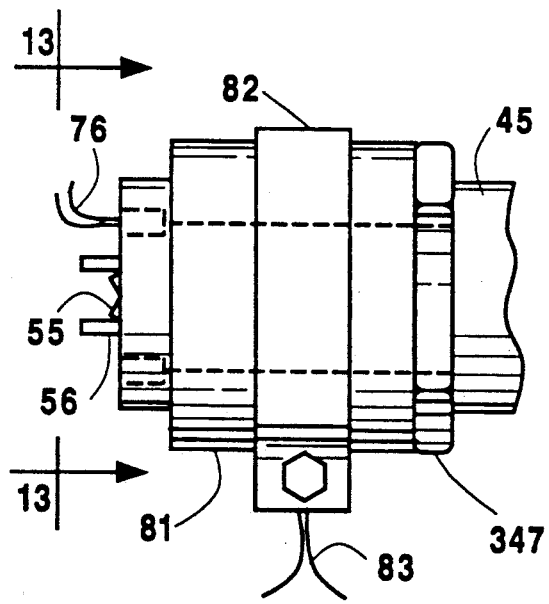
FIG. 25 is a side view of a more preferred embodiment of the heated nozzle assembly and retaining nut shown in FIG. 22.
Figure 26:
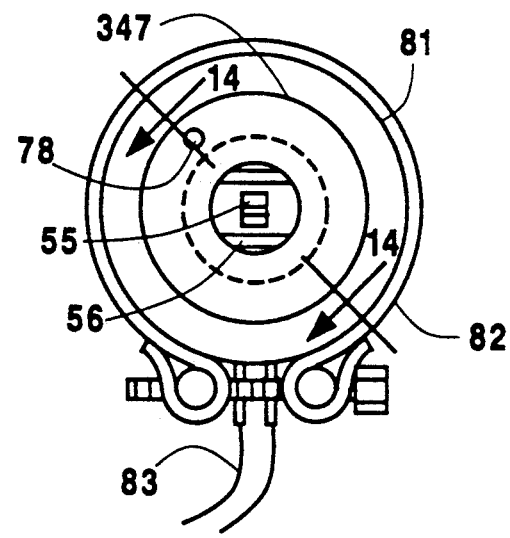
FIG. 26 is an end view of the assembly shown in FIG. 25 taken along line 13—13 of FIG. 25.

A more preferred embodiment for heating the nozzle assembly is illustrated in FIGS. 25 to 27 where FIG. 25 shows a view of a band heater 81, which may be any commercially obtainable heater such as Watlow Clamping Band Heater, positioned on and secured by clamp 82 to threaded nozzle retaining nut 347. Nut 347 secures nozzle assembly member 56, containing spray tip 55, to spray gun head 45. Electrical conductors 83 carry current to and from heater 81 and thermocouple wires 76 in thermowell 78, bored in 347, provide for measuring the temperature in the proximity of nozzle assemble 56 and spray tip 55. Wires 76 and 78 are connected to a standard process control system, not shown, which is used to control tip 55 at desired temperature.

FIG. 26 illustrates the view taken along line 13—13 of FIG. 25 and shows the positioning of thermowell 78. FIG. 27 shows a cross-sectional view, taken along line 14—14 of threaded nozzle retaining nut 347, where front cavity 79 is made by boring to exact dimensions to receive front cylindrical lip of nozzle 56. Threaded rear cavity 80 is made by boring to exact dimensions to receive front portion 46 on front shoulder 58 of spray gun head 45. Thermowell 78 is made by boring into nut 347 to the desired depth.

In operation, the temperature level is set and controlled at the set temperature through temperature sensing thermocouple 76 and temperature process control instrumentation to maintain tip 55 at the desired temperature depending upon the requirement for the specific coating material-supercritical fluid mixture being sprayed, to counteract spray nozzle assembly cooling caused by internal vaporization of the supercritical fluid, such as supercritical carbon dioxide. In this manner, the effect of evaporative cooling on the spray temperature is counteracted.

The embodiments shown in FIGS. 22 to 27 are not constrained to the specific designs illustrated. Means other than resistance heating to effect counteraction to the temperature loss caused by carbon dioxide vaporization just prior to the orifice tip may also be utilized.

As a further embodiment of the present invention, in which the volume between the shut off needle valve and the nozzle tip is reduced, reference is made to FIGS. 29 to 33 which present an improved spray tip and valve positioning. A conventional prior art nozzle assembly N' is shown in FIG. 28, such as that disclosed in U.S. Pat. No. 3,556,411. It includes an orifice tip B' secured in adapter A'. A washer 48' spans the end of the screw 47' and adjacent shoulder of the tip to open space for fluid to reach and enter the lateral inlet ports 33'. Screw 47' with a screw driver slot 50' has large central openings 49' and 71 for the free, easy flow of fluid to the tip. FIG. 28 also illustrates a connection between nozzle assembly N' and the front end of a hydraulic spray gun, such as a high pressure hydraulic airless paint spray gun, illustrated in U.S. Pat. No. 3,116,020. Particularly, the front end of the gun G' has external threads wherewith the internally threaded nut 51' secures the nozzle assembly N' in fluid tight contact with the end of the gun. The gun has a large fluid passage 52' leading from the large, fast opening and closing valve 53' as shown and described in said patent. The void spaces, as exemplified by 49' 52' and 71, contribute to spitting and foaming when such a configured gun is used with coating material solutions that contain carbon dioxide or other supercritical fluids as a solvent.

FIGS. 29 to 33 is a modification of the conventional dome-style airless spray nozzle wherein the tungsten carbide tip 86 is elongated to provide reinforcement to withstand the force of fast opening and closing valve 73' against it. The back of 86 has a lapped spherical female seat complementary to the spherical male exterior ball valve 73', attached to needle 72', providing a tight sealing engagement when the tip is seated and retained by collar 84. Partial cross-sectional FIG. 33 illustrates nozzle assembly 56', which includes the modified spray tip 86 and collar 84, positioned and secured in fluid tight contact with the front end of the gun by threaded nut 47. This embodiment of the present invention accordingly minimizes the void space passageway through which the coating mixture travels between the spray valve and the atomization orifice formed by channel 95 and chamber 71, as shown for example in FIG. 3, and spaces 49', 52' and 71, for example, as shown in FIG. 28. In operation, spitting and oozing out of the spray tip due to the expansion and evaporation of carbon dioxide in retained material following shut off of the spray valve is minimal resulting in improved and optimal spraying and coating of the substrate.

In an alternative embodiment, the insertion of plastic inserts, or inserts of other materials, into standard commercially obtainable spray nozzles to fill the free volume and cavities that are downstream from the flow valve may be utilized. Commercially available inserts, such as Spraying Systems No. 15153-NY Insert for Airless TC Nozzles, are known to those skilled in the art, but we have determined that such standard inserts containing a center bore of 62 mils in diameter does not achieve the desired results of minimizing, or eliminating, spitting and oozing following shut off of the spray valve. We discovered that modifying and redesigning the insert to have a center bore of from about 20 mils to about 50 mils in diameter results in a lower and acceptable level of spitting and oozing. For example, an insert with a center bore of about 31 mils in diameter gave 75% less cross-sectional area resulting in a significantly lower and acceptable level of spitting and oozing. Other methods of achieving the objective of this embodiment of the present invention, although not shown, include: using a flat spray nozzle assembly that has minimal contained volume and mounting it directly against the flow valve housing; making normal spray nozzles with less contained volume by simply having a small channel for the spray mixture to flow through to the spray orifice instead of the usual cavity; and, making smaller diameter bores in the spray gun valve orifice.

For automatic spray guns that are actuated by an air line, an air line quick-exhaust valve, such as a Nordson Model 901-262, is preferably attached to the inlet of the air line to the spray gun to provide quicker closing of the spray gun valve.

While preferred forms of the present invention have been described, it should be apparent to those skilled in the art that methods and apparatus may be employed that are different from those shown without departing from the spirit and scope thereof.

What is claimed is:

1. In a method for spraying a coating mixture comprising coating material and supercritical fluid in which the coating mixture, at a temperature T°, is fed through a feeding means to a spray gun from which the coating mixture is sprayed in a feathered spray pattern, the improvement which comprises maintaining the temperature of the coating mixture while in the the spray gun, or, in combination, while in the spray gun and the feeding means, at a temperature which is substantially equal to or greater than temperature T° such that a feathered spray pattern is maintained as the coating mixture is sprayed.

2. The method of claim 1, wherein the coating material and the supercritical fluid are combined in the feeding means to form the coating mixture just prior to entering the spray gun.

3. The method of claims 1 or 2, wherein the spray gun comprises a housing, an inlet means within said housing through which the coating mixture is passed into said gun, and a passageway for the flow of coating mixture communicating between said inlet means and a valve means through which the coating mixture is passed to a spray orifice means from which the coating mixture leaves said gun as a feathered spray, and wherein the temperature of the coating mixture is maintained by heating the spray gun.

4. The method of claim 3, wherein the spray gun is heated by heat transfer fluid circulating within passages provided in the housing of the spray gun.

5. The method of claim 4, wherein the heat transfer fluid is selected from the group consisting of water, glycol, mineral oils, silicone compounds, and mixtures thereof.

6. The method of claim 4, wherein the heat transfer fluid is water.

7. The method of claim 4, wherein the temperature of the coating mixture is measured.

8. The method of claim 7, wherein a signal is generated in response to the measured temperature of the coating mixture.

9. The method of claim 8, wherein the heating of the spray gun is controlled responsive to the signal generated.

10. The method of claim 3, wherein the spray orifice means comprises a nozzle assembly containing a spray orifice tip and the coating mixture is heated by heating the nozzle assembly.

11. The method of claim 3, wherein the spray orifice means comprises a nozzle assembly containing a spray orifice tip and a retaining means for retaining the nozzle assembly to the housing of the spray gun and the coating mixture is heated by heating the retaining means.

12. The method of claim 3, wherein the spray gun further comprises a second passageway for the flow of coating mixture communicating between the valve means and the spray orifice means and wherein the temperature of the coating mixture is maintained by reducing the volume of said second passageway.

13. The method of claim 12, wherein the volume of the second passageway is reduced by providing a valve seat located on the valve means to be juxtaposed to a spray orifice tip located on the spray orifice means.

14. The method of claim 12, wherein the volume of the second passageway is reduced by providing an insert within said passageway having a channel to accommodate the flow of coating mixture as it passes from the valve means to the spray orifice means.

15. The method of claim 13, wherein the temperature of the coating mixture is maintained by mixing the coating mixture as it enters the spray gun at the inlet means and travels through the passageway communicating between said inlet means and the valve means.

16. The method of claim 15, wherein the coating mixture is mixed by a static mixer provided in said passageway.

17. The method of claim 16, wherein the static mixer contains a plurality of mixing elements past which the coating mixture travels causing the mixing of the coating mixture.

18. The method of claim 3, wherein the temperature of the coating mixture is maintained by by additionally heating the coating mixture or coating material in the feeding means.

19. The method of claim 18, wherein the feeding means is indirectly heated by a heat transfer fluid indirectly communicating with the coating mixture or coating material.

20. The method of claim 19, wherein the heat transfer fluid is selected from the group consisting of water, glycol, mineral oils, silicone compounds, and mixtures thereof.

21. The method of claim 19, wherein the heat transfer fluid is water.

22. The method of claim 18, wherein the temperature of the coating mixture or coating material is measured.

23. The method of claim 22, wherein a signal is generated in response to the measured temperature of the coating mixture or coating material.

24. The method of claim 23, wherein the heating of the feeding means is controlled responsive to the signal generated.

25. The method of claim 18, wherein the feeding means is heated by an electrical heating element.

26. The method of claim 25, wherein the electrical heating element is in indirect contact with the coating mixture or coating material.

27. A method for spraying a coating mixture comprising coating material and supercritical fluid in a feathered spray pattern at a temperature effective to provide such a feathered spray pattern which comprises supplying coating mixture to a feeding means, which feeding means supplies the coating mixture to a spray gun from which the coating mixture is sprayed in a feathered spray pattern, and which spray gun comprises a housing, an inlet means within said housing through which the coating mixture is passed into said gun, a first passageway for the flow of coating mixture communicating between said inlet means and a valve means through which the coating mixture is passed to a spray orifice means from which the coating mixture leaves said gun as a feathered spray, and a second passageway for the flow of coating mixture communicating between the valve means and the spray orifice means, wherein the temperature of the coating mixture is maintained effective to provide the feathered spray pattern by:

a) including a plurality of conduits within said feeding means which are juxtaposed to one another and contained within an overall conduit, at least one or more of the plurality of conduits containing coating mixture and at least one or more of the plurality of conduits containing circulating heat transfer fluid for providing indirect heat exchange to the coating mixture; or b) indirectly heating the coating mixture while in said housing of the spray gun by providing passages in the housing for the circulation of a heat transfer fluid; or c) heating the coating mixture as it passes through a spray orifice tip in a nozzle assembly contained within the spray orifice means by providing the nozzle assembly with a heating means located in or on said nozzle assembly; or d) placing an insert having a channel to accommodate the flow of coating mixture as it passes from the valve means to the spray orifice means within said second passageway to effectively reduce the volume of said second passageway thereby helping to at least maintain the temperature in the coating mixture; or e) providing said valve means with a valve seat to be in juxtaposition with a spray orifice tip located in the spray orifice means to thereby reduce the volume of said second passageway and help maintain the temperature in the coating mixture; or f) providing said first passageway with a static mixer through which the coating mixture passes to help maintain the temperature in the coating mixture; or g) a combination thereof.

* * * * *